US012639005B2

(12) United States Patent
Kim et al.

(10) Patent No.: US 12,639,005 B2
(45) Date of Patent: May 26, 2026

(54) STORAGE DEVICE FOR SKIPPING REDUNDANT REPLAY AND JOURNAL REPLAY METHOD THEREOF

(71) Applicant: SAMSUNG ELECTRONICS CO., LTD., Suwon-si (KR)

(72) Inventors: Hyeju Kim, Suwon-si (KR); Sodam Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/809,810

(22) Filed: Aug. 20, 2024

(65) Prior Publication Data

US 2025/0251876 A1      Aug. 7, 2025

(30) Foreign Application Priority Data

Feb. 5, 2024    (KR) ........................ 10-2024-0017203

(51) Int. Cl.
*G06F 3/06* (2006.01)
(52) U.S. Cl.
CPC .......... G06F 3/0656 (2013.01); G06F 3/0604 (2013.01); G06F 3/0679 (2013.01)
(58) Field of Classification Search
CPC ..... G06F 3/0656; G06F 3/0604; G06F 3/0679
USPC ........................................................ 711/154
See application file for complete search history.

(56) References Cited

U.S. PATENT DOCUMENTS

| | | | |
|---|---|---|---|
| 9,927,985 B2 | 3/2018 | Zhang et al. | |
| 9,940,261 B2 | 4/2018 | Booth et al. | |
| 10,489,289 B1 | 11/2019 | Peterson et al. | |
| 10,621,051 B2 | 4/2020 | Camp et al. | |
| 10,936,247 B2 | 3/2021 | Kang | |
| 11,704,050 B2 | 7/2023 | Kim et al. | |
| 11,841,801 B2 * | 12/2023 | Tomlin ................. | G06F 3/0679 |
| 12,147,694 B2 * | 11/2024 | Tomlin ................. | G06F 3/0608 |
| 2009/0150599 A1 * | 6/2009 | Bennett .............. | G06F 11/1471 |
| | | | 711/E12.019 |
| 2023/0146696 A1 | 5/2023 | Kim | |
| 2023/0289285 A1 | 9/2023 | Harris et al. | |
| 2024/0020226 A1 * | 1/2024 | Yim ................... | G06F 12/0246 |
| 2024/0045597 A1 | 2/2024 | Cho et al. | |

* cited by examiner

*Primary Examiner* — Than Nguyen
(74) *Attorney, Agent, or Firm* — Sughrue Mion, PLLC

(57) ABSTRACT

A journal replay method of a storage device includes loading metadata into a buffer memory, initializing a first trim bit and a second trim bit of a trim table to a clear state, the first and second trim bits indicating a replay status of respective first and second trim journals in first and second address ranges of the metadata, updating first metadata corresponding to the first address range by replaying the first trim journal, setting the first trim bit corresponding to the replayed first trim journal to a set state, determining whether the second address range of the second trim journal overlaps the first address range, and skipping replay of the second trim journal based on a state of the first trim bit based on determining that the second address range overlaps the first address range.

20 Claims, 15 Drawing Sheets

Figure 3:
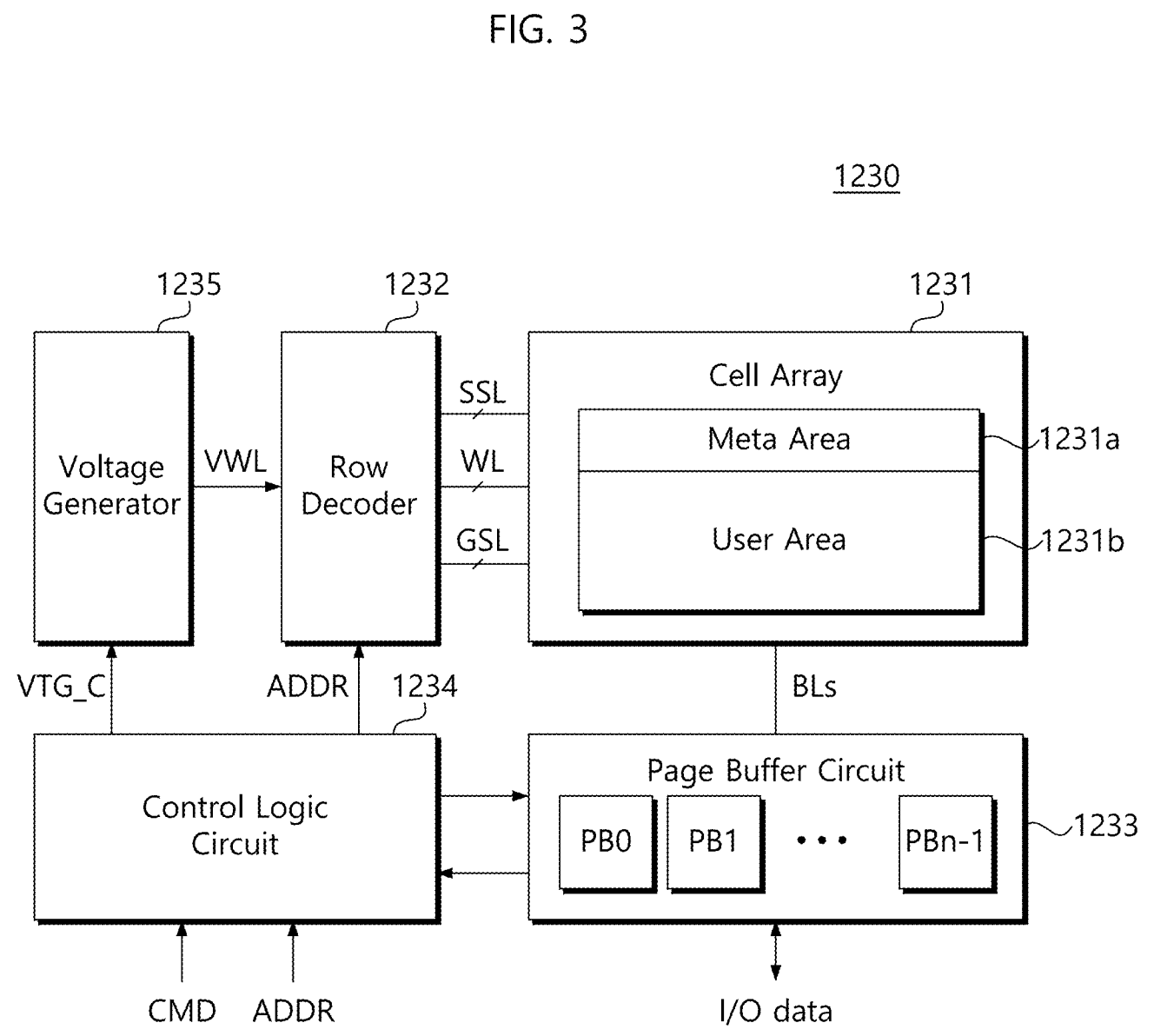

Cell Array

1231a — Meta Area

1231b — User Area

SSL
WL
GSL

BLs

1232

Row Decoder

VWL

1235

Voltage Generator

VTG_C

1234

Control Logic Circuit

ADDR

CMD    ADDR

1233

Page Buffer Circuit

PB0    PB1    • • •    PBn-1

I/O data

Start

Update meta data — S110

Add journal entry to journal buffer — S120

S130 — Trim journal ?

Yes → Apply range journal buffering — S140

No → Apply normal journal buffering (single LPN type except for trim journal) — S150

Compose meta write buffer — S160

Write meta to NVM — S170

End

FIG. 8

Trim Table

| JNL_SEQ | LPN Range | bTrimmed bit |
|---|---|---|
| 0 | LPN_0~LPN_19 | 0 |
| 1 | LPN_20~LPN_39 | 0 |
| 2 | LPN_40~LPN_59 | 0 |
| 3 | LPN_60~LPN_79 | 0 |
| ... | ... | ... |
| n-1 | LPN_m-19~LPN_m | 0 |

FIG. 10A

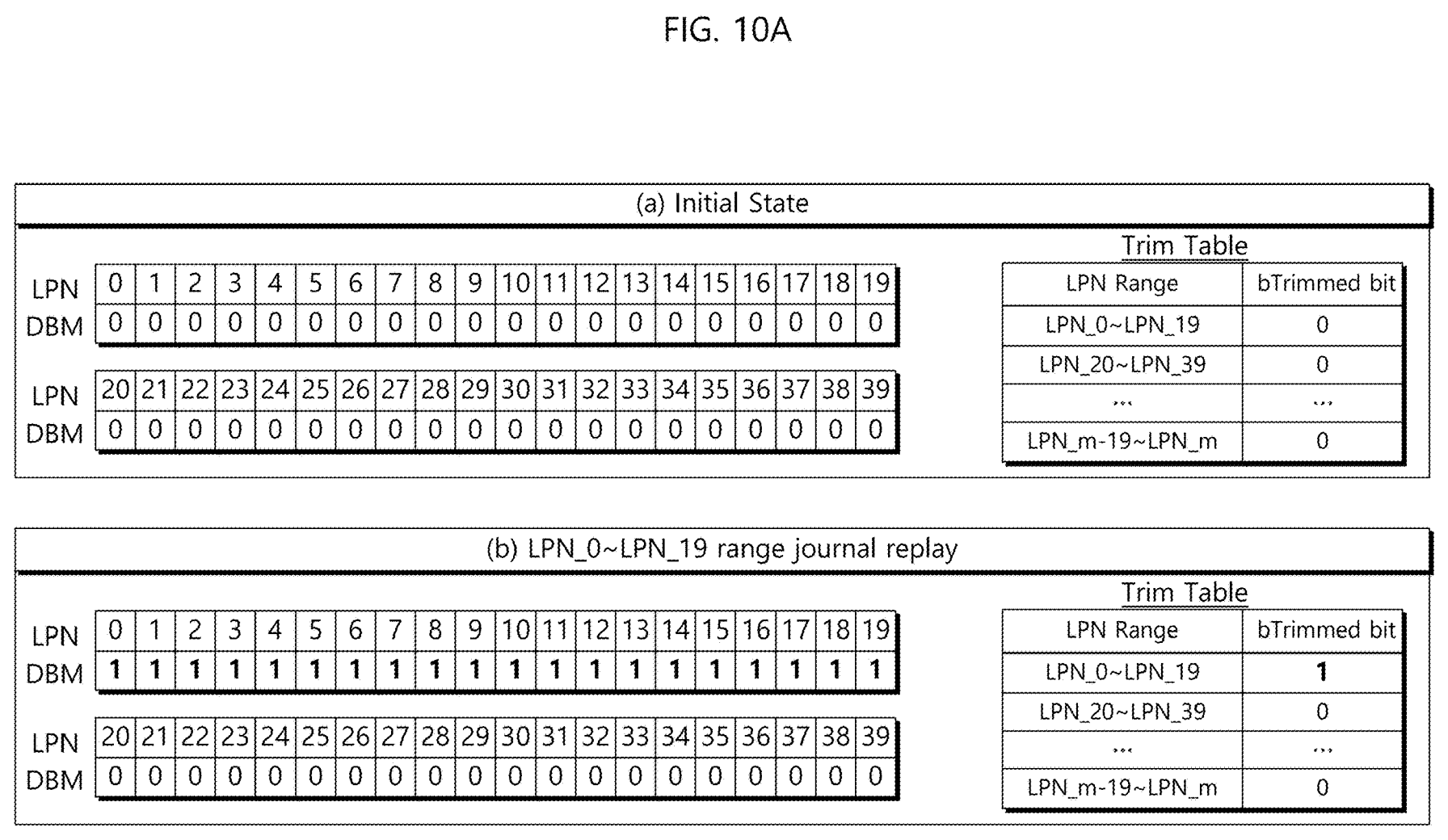

(a) Initial State

Trim Table

| LPN Range | bTrimmed bit |
|---|---|
| LPN_0~LPN_19 | 0 |
| LPN_20~LPN_39 | 0 |
| ... | ... |
| LPN_m-19~LPN_m | 0 |

| LPN | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| DBM | 0 | 0 | 0 | 0 | 0 | 0 | 0 | 0 | 0 | 0 | 0 | 0 | 0 | 0 | 0 | 0 | 0 | 0 | 0 | 0 |

| LPN | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| DBM | 0 | 0 | 0 | 0 | 0 | 0 | 0 | 0 | 0 | 0 | 0 | 0 | 0 | 0 | 0 | 0 | 0 | 0 | 0 | 0 |

(b) LPN_0~LPN_19 range journal replay

Trim Table

| LPN Range | bTrimmed bit |
|---|---|
| LPN_0~LPN_19 | 1 |
| LPN_20~LPN_39 | 0 |
| ... | ... |
| LPN_m-19~LPN_m | 0 |

| LPN | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| DBM | 1 | 1 | 1 | 1 | 1 | 1 | 1 | 1 | 1 | 1 | 1 | 1 | 1 | 1 | 1 | 1 | 1 | 1 | 1 | 1 |

| LPN | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| DBM | 0 | 0 | 0 | 0 | 0 | 0 | 0 | 0 | 0 | 0 | 0 | 0 | 0 | 0 | 0 | 0 | 0 | 0 | 0 | 0 |

(c) LPN_20~LPN_39 range journal replay (d) LPN_0~LPN_19 range journal replay

Skip setting DBM

FIG. 12C (e) LPN_20~LPN_39 range journal replay

| LPN | 0 | 1 | 2 | 3 | 4 | 5 | 6 | 7 | 8 | 9 | 10 | 11 | 12 | 13 | 14 | 15 | 16 | 17 | 18 | 19 |
|-----|---|---|---|---|---|---|---|---|---|---|----|----|----|----|----|----|----|----|----|----|
| DBM | 1 | 1 | 1 | 1 | 1 | 0 | 1 | 1 | 1 | 1 | 1 | 1 | 1 | 1 | 1 | 1 | 1 | 1 | 1 | 1 |

| LPN | 20 | 21 | 22 | 23 | 24 | 25 | 26 | 27 | 28 | 29 | 30 | 31 | 32 | 33 | 34 | 35 | 36 | 37 | 38 | 39 |
|-----|----|----|----|----|----|----|----|----|----|----|----|----|----|----|----|----|----|----|----|----|
| DBM | 1 | 1 | 1 | 1 | 1 | 1 | 1 | 1 | 1 | 1 | 1 | 1 | 1 | 1 | 1 | 1 | 1 | 1 | 1 | 1 |

| LPN Range | bTrimmed bit |
|-----------|--------------|
| LPN_0~LPN_4 | 1 |
| LPN_5 | 0 |
| LPN_6~LPN_39 | 1 |
| ... | ... |
| LPN_m-19~LPN_m | 0 |

No need to set again

STORAGE DEVICE FOR SKIPPING REDUNDANT REPLAY AND JOURNAL REPLAY METHOD THEREOF

CROSS-REFERENCE TO RELATED APPLICATIONS

This application claims benefit of priority under 35 U.S.C. § 119 to Korean Patent Application No. 10-2024-0017203, filed on Feb. 5, 2024, in the Korean Intellectual Property Office, the disclosure of which is incorporated by reference herein in its entirety.

BACKGROUND

1. Field

The present disclosure relates generally to a storage device, and more particularly, to a storage device for skipping redundant replays and a journal replay method thereof.

2. Description of Related Art

A time period (or duration) of a storage device to transition from a booting state to a state in which the storage device may process input/output commands may be referred to as an initialization time and/or an open time. A significant contributor to the total initialization time may be a time needed by the storage device to read metadata backed up (e.g., stored) in a non-volatile device (e.g., a NAND flash memory) and transfer the metadata to a volatile device (e.g., a dynamic random access memory (DRAM)). For example, when using a journaling technique, metadata loaded into a DRAM may need to be updated again using a journal log. Such a procedure may be referred to as a journal replay. Typically, a journal replay process may make up a significant portion of the open time of the storage device.

Among journal data, the trim journal generated by a trim request from a host may be composed of a range of logical addresses. For example, the trim journal may consist of a start logical address (Start LPN) and an end logical address (End LPN). That is, different trim journals may have different logical address ranges of different sizes, and consequently, replaying one trim journal may need relatively more time than replaying other types of journals. Additionally, in situations where the same trim range may need to be repeatedly replayed, the open time of the storage device may be adversely affected.

SUMMARY

One or more example embodiments of the present disclosure provide a storage device and a journal replay method thereof that may skip redundant replays for the same address range when operating a journal replay in the form of an address range.

According to an aspect of the present disclosure, a journal replay method of a storage device includes loading metadata into a buffer memory, initializing a first trim bit and a second trim bit of a trim table to a clear state, the first trim bit indicating a first replay status of a first trim journal in a first address range of the metadata, the second trim bit indicating a second replay status of a second trim journal in a second address range of the metadata, updating first metadata corresponding to the first address range by replaying the first trim journal, setting the first trim bit corresponding to the replayed first trim journal to a set state, determining whether the second address range of the second trim journal overlaps the first address range, and skipping replay of the second trim journal based on a state of the first trim bit based on determining that the second address range overlaps the first address range.

According to an aspect of the present disclosure, a storage device includes a non-volatile memory device storing metadata and journal data, a buffer memory including a metadata buffer into which the metadata is loaded and a trim table composed for replay of at least one of a trim journal or a write journal, and a storage processor communicatively coupled to the non-volatile memory device and the buffer memory. The storage processor is configured to read the metadata from the non-volatile memory device, load the metadata into the metadata buffer, update the metadata during a journal replay operation by sequentially replaying the journal data from the non-volatile memory device, replay a second trim journal after replay of a first trim journal, based on a determination that a first address range of the first trim journal and a second address range of the second trim journal do not overlap, and skip the replay of the second trim journal, based on a determination that the first address range and the second address range overlap.

According to an aspect of the present disclosure, a journal replay method of a storage device includes initializing a trim table including a trim bit indicating whether to execute a replay of a trim journal, updating metadata by replaying a first trim journal, setting a first trim bit corresponding to a first address range of the first trim journal of the trim table to a set state, checking whether a second address range of the second trim journal is included in the first address range of the first trim journal, and skipping replay of the second trim journal based on the second address range of the second trim journal overlapping the first address range of the first trim journal.

Additional aspects may be set forth in part in the description which follows and, in part, may be apparent from the description, and/or may be learned by practice of the presented embodiments.

BRIEF DESCRIPTION OF THE FIGURES

The above and other aspects, features, and advantages of certain embodiments of the present disclosure may be more apparent from the following description taken in conjunction with the accompanying drawings, in which:

FIG. 1 is a block diagram showing a storage system including a storage device, according to an embodiment;

FIG. 3 is a block diagram showing the structure of the non-volatile memory device shown in FIG. 2, according to an embodiment;

FIG. 8 is a diagram illustrating the trim table of FIG. 7 by way of example, according to an embodiment;

FIGS. 10A and 10B are tables sequentially showing the journal replay method, according to an embodiment;

FIGS. 12A, 12B, and 12C are diagrams showing the replay process of the trim journal and write journal, according to an embodiment.

DETAILED DESCRIPTION

Figure 2:
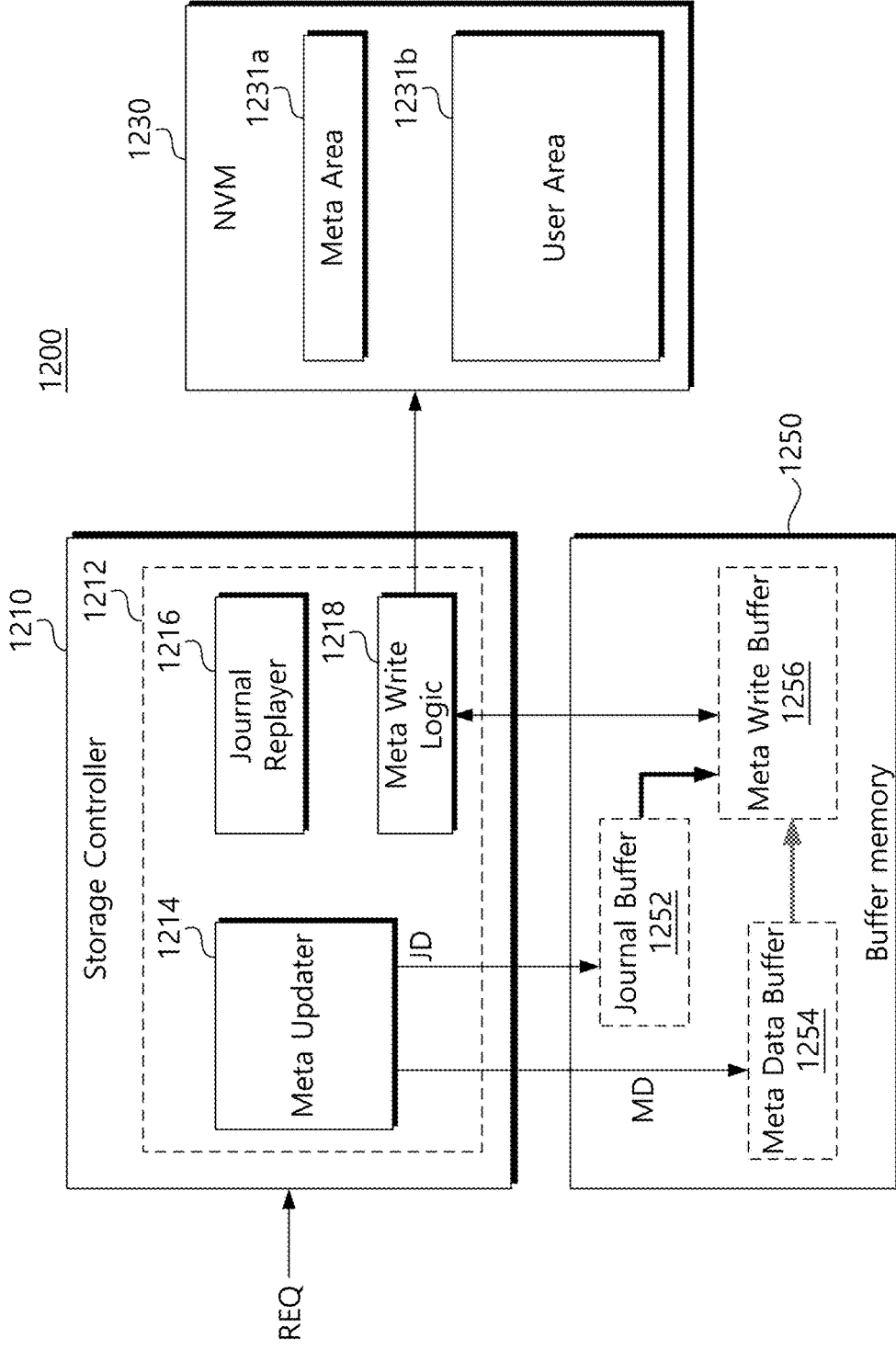
FIG. 2 is a block diagram exemplarily showing a metadata writing operation of the storage device of FIG. 1, according to an embodiment.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, when an element or layer is referred to as "overlapping" another element or layer, the element or layer may cover at least a portion of the other element or layer, where the portion may include a fraction of the other element or may include an entirety of the other element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

In the present disclosure, the articles "a" and "an" are intended to include one or more items, and may be used interchangeably with "one or more." Where only one item is intended, the term "one" or similar language is used. For example, the term "a processor" may refer to either a single processor or multiple processors. When a processor is described as carrying out an operation and the processor is referred to perform an additional operation, the multiple operations may be executed by either a single processor or any one or a combination of multiple processors.

Hereinafter, various embodiments of the present disclosure are described with reference to the accompanying drawings.

Figure 1:
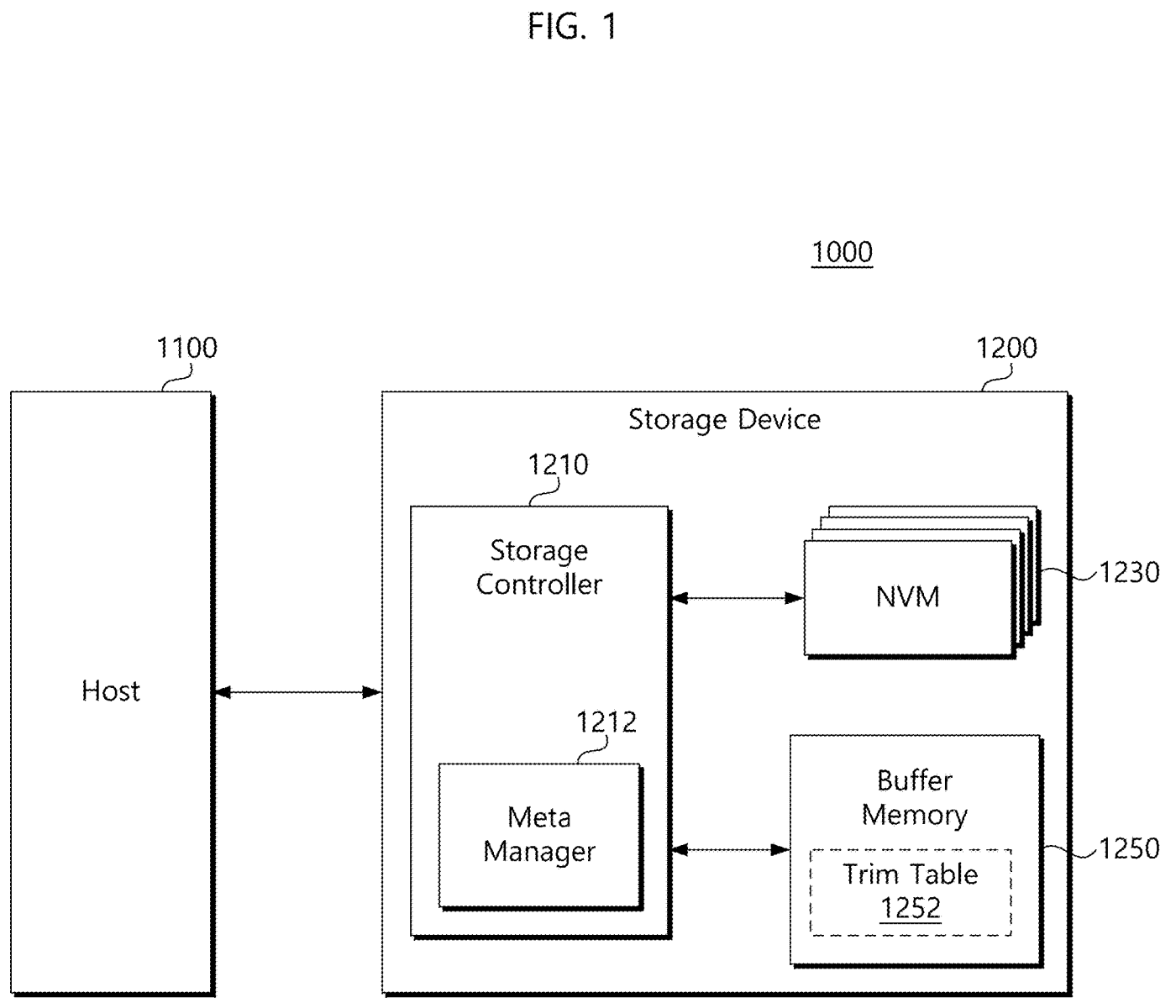

FIG. 1 is a block diagram showing a storage system including a storage device, according to an embodiment. The storage system 1000 may include a host 1100 and a storage device 1200. The storage device 1200 may include a storage controller 1210, a non-volatile memory device 1230, and a buffer memory 1250.

The host 1100 may manage and/or process overall operations of the storage system 1000. For example, the host 1100 may transmit read, write, and/or erase requests to the storage device 1200. As another example, the host 1100 may perform various arithmetic/logical operations to access the storage device 1200. In an embodiment, the host 1100 may include one or more processor cores. The host 1100 may be implemented using a dedicated circuit such as, but not limited to, field programmable gate arrays (FPGAs) and/or application specific integrated circuit (ASICs), and/or may be implemented as a system on chip (SoC). The host 1100 may include at least one of a general-purpose processor, a dedicated processor, and an application processor. The host 1100 may be the processor itself and/or an electronic device or system including a processor.

The storage device 1200 may include a storage controller 1210, a non-volatile memory (NVM) device 1230, and a buffer memory 1250. The storage controller 1210 may program data in the non-volatile memory device 1230 according to a write request from the host 1100. Alternatively or additionally, the storage controller 1210 may read data stored in the non-volatile memory device 1230 according to a read request from the host 1100. For this function, the storage controller 1210 may use a mapping table that may define a correspondence between the logical address and physical address of data stored (or to be stored) in the non-volatile memory device 1230. The mapping table may be stored and/or managed in the buffer memory 1250, which may be provided as a dynamic random access memory (DRAM).

The storage controller 1210 may control the non-volatile memory device 1230 and the buffer memory 1250. For example, the storage controller 1210 may write data requested to be written from the host 1100 to the non-volatile memory device 1230. As another example, the storage controller 1210 may provide an address ADDR, a command CMD, and/or a control signal to the non-volatile memory device 1230 to perform write, read, and/or erase operations of the non-volatile memory device 1230.

The storage controller 1210 may process metadata generated for memory management operations according to a journaling technique. For example, the storage controller 1210 may accumulate metadata and store information about parts to be changed in the accumulated metadata as a journal log and/or journal data. Subsequently, at a specific point in time, a meta write buffer may be composed using journal data and metadata, and programmed in the non-volatile memory device 1230 in units of meta write buffers.

That is, when a power error and/or another power-on reset occurs, the storage controller 1210 may load metadata backed up in the non-volatile memory device 1230 into the buffer memory 1250. In addition, the storage controller 1210 may perform journal replay using journal data backed up in the non-volatile memory device 1230. For example, the storage controller 1210 may configure the trim table 1251 for the trim journal and the write journals. The storage controller 1210 may use the trim table 1251 to perform replay of the trim journal and the write journal. As used herein, a trim journal may include, but not be limited to, an address range type journal. That is, for replay of the trim journal, the replay unit may be continuous and may target a relatively large memory area. Therefore, the time required to replay a range-type journal such as a trim journal may be relatively large. In the case of journals with this range type, redundant replays for the same address range may occur. Since the storage controller 1210 uses the trim table 1251, redundant replays for the same address range may be skipped or minimized in journal replay operations.

As used herein, metadata may refer to data for managing user data and/or data generated by the storage system 1000 to manage the non-volatile memory device 1230. For example, the metadata may include at least one of mapping information used to convert a logical address into a physical address in the non-volatile memory device 1230, physical block information corresponding to information on memory pages included in the physical block of the non-volatile memory device 1230, ages, trim data indicating data deleted from the host 1100, trim data representing deleted data from host 1100, and various information for managing the memory space of the non-volatile memory device 1230.

In addition, journal data may represent data including log information corresponding to changes in user data and/or metadata. For this purpose, journal data may include a plurality of log entry information. For example, journal data may include information about change points (check points) in user data and/or metadata. In some embodiments, log entry information may include information about a type indicating an operation in which a metadata change occurred and actual data for restoring the metadata change. Information about the type representing the operation in which metadata change occurred may include information defining the types of all operations that may change metadata, such as, but not limited to, write operation, block allocation operation, and page copy operation. Substantive data for recovering metadata changes may include logical addresses, old physical addresses, and new physical addresses.

For example, among journal data, trim journals may have a range format. That is, a trim journal may be generated with a continuous address range according to a format or trim request for a specific area. Although the trim journal has been described as an example of a range-type journal, the present disclosure is not limited thereto. It may be understood that the redundant replay skip function using the trim table 1251 of the present disclosure may be applied to various journal data generated in the form of a range in addition to the trim journal.

For the redundant replay skip function using the trim table 1251 described above, the storage controller 1210 may include a meta manager 1212. The meta manager 1212 may use the trim table 1251 to skip replay of overlapping address ranges when replaying the trim journal. That is, the meta manager 1212 may configure the trim table 1251 for range-type journals during journal replay operation. The meta manager 1212 may check trim journals in overlapping address ranges through the trim table 1251 during a trim journal replay operation. The meta manager 1212 may omit journal replay for trim journals in overlapping address ranges. The meta manager 1212 may update the trim table 1251 according to the execution of journal replay. The time needed for replay may be significantly reduced by skipping redundant replays of the trim journal using the trim table 1251. Accordingly, the open time of the storage device 1200 during power-on reset (POR) or booting may be reduced.

As used herein, open time may refer to the time from when power is applied during booting or initialization of the storage device 1200 to the storage device 1200 reaching a state capable of processing input/output operations. The open time may also be referred to as initialization time. In an embodiment, a significant portion of the open time may be taken (used) to read metadata from the non-volatile memory device 1230 and move the metadata to the buffer memory 1250 (or volatile memory). For example, when using the journaling technique, the time needed for replays may use a relatively large portion of the open time. Replay may refer to a function or operation that may re-update metadata loaded into the buffer memory 1250 using the journal log.

The non-volatile memory device 1230 may store data received from the storage controller 1210 and/or transmit the stored data to the storage controller 1210 under the control of the storage controller 1210. The non-volatile memory device 1230 may include a plurality of chips and/or dies implemented as NAND-type flash memory, for example. Each chip may include a plurality of memory blocks. Each of the plurality of memory blocks may have a three-dimensional (3D) memory structure in which word line layers may be stacked in a vertical direction on the substrate. Each of the memory blocks may be managed by the storage controller 1210 through information for wear leveling, such as, but not limited to, an erase count (EC).

The buffer memory 1250 may provide a buffer function and/or a metadata memory function of the storage device 1200. Additionally, the buffer memory 1250 may support a direct memory access (DMA) function of data exchanged between the non-volatile memory device 1230 and the host 1100. That is, the buffer memory 1250 may provide a buffer function to temporarily store data programmed in the non-volatile memory device 1230 and/or data output from the non-volatile memory device 1230. In particular, the buffer memory 1250 may store various metadata such as, but not limited to, a mapping table generated by the storage controller 1210. The buffer memory 1250 may include a metadata buffer storing metadata, a journal buffer storing journal data, and a meta write buffer storing journal data and metadata to be programmed.

According to the above-described configuration, the storage device 1200 may skip redundant replays for the same address range during journal replay operation. The time required for replay of address range journals such as, but not limited to, trim journals, may be significantly reduced by the redundant replay skip function. Therefore, it may be expected that the open time of the storage device 1200 during booting may be significantly reduced when compared to related storage devices.

FIG. 2 is a block diagram exemplarily showing a metadata writing operation of the storage device of FIG. 1, according to an embodiment. Referring to FIG. 2, the storage device 1200 may include a storage controller 1210, a non-volatile memory device 1230, and a buffer memory 1250. By way of example, the storage controller 1210, the non-volatile memory device 1230, and the buffer memory 1250 may each be provided as one chip, one package, and/or one module. Alternatively or additionally, the storage controller 1210, the non-volatile memory device 1230, and buffer memory 1250 may be included in one chip, one package, or one module. That is, the storage controller 1210, the non-volatile memory device 1230, and buffer memory 1250 may be composed of storage devices such as, but not limited to, embedded memory, memory card, memory stick, and solid state drive (SSD).

The storage controller 1210 may be configured to control the non-volatile memory device 1230 and the buffer memory 1250. For example, the storage controller 1210 may write data to the non-volatile memory device 1230 and/or read data stored in the non-volatile memory device 1230 at the request of the host 1100. To access the non-volatile memory device 1230, the storage controller 1210 may receive an input/output (I/O) request such as, but not limited to, a read command, or a write command. An I/O request from the host 1100 may include a logical address LPN.

For example, the storage controller 1210 may write the requested data to the user area 1231b of the non-volatile memory device 1230 in response to a write request W_REQ from the host 1100. The storage controller 1210 may generate metadata MD to execute a write request W_REQ and/or various memory management operations.

Additionally, the storage controller 1210 may manage metadata by applying a journaling technique that may configure the meta write buffer 1256 by adding journal data JD during a write operation of metadata. Journal data JD may include, but not be limited to, trim journals, write journals, or the like.

The storage controller 1210 may include a meta manager 1212 that may skip redundant replays during the replay operation. The meta manager 1212 may include a meta updater 1214, a journal replayer 1216, and meta write logic 1218.

The meta updater 1214 may manage metadata MD and/or journal data JD. For example, the meta updater 1214 may generate metadata MD and store the metadata MD in the metadata buffer 1254. The meta updater 1214 may generate journal data JD and accumulate the journal data JD in the journal buffer 1252. Additionally, the meta updater 1214 may perform initialization based on metadata MD read from the non-volatile memory device 1230 when the storage device 1200 is reset and/or powered on.

The meta updater 1214 may be implemented in various forms within the storage controller 1210. According to an embodiment, the meta updater 1214 may be implemented in hardware and/or software form. For example, when the meta updater 1214 is implemented in the form of hardware, the meta updater 1214 may include circuits for managing metadata MD and/or journal data JD. Additionally, for example, if the meta updater 1214 is implemented in the form of software, a program (or instructions) stored in the storage controller 1210 may be executed by a processor to perform data management operations. However, the present disclosure is not limited to the above embodiments, and the meta updater 1214 may be implemented in a form that may combine software and hardware, such as, but not limited to, firmware. In one embodiment, all or part of the meta updater 1214 may be included in a flash translation layer (FTL).

The journal replayer 1216 may be configured to replay journal data JD to recover metadata MD. For example, when the storage device 1200 is powered on again after a sudden power-off (SPO), metadata MD stored in the non-volatile memory device 1230 may be loaded into the buffer memory 1250. As described above, the metadata MD stored in the non-volatile memory device 1230 may not be the latest version, and in such a case, the reliability of the data stored in the non-volatile memory device 1230 may not be guaranteed. Consequently, an operation to restore metadata MD to the latest version may be needed. The journal replayer 1216 may restore the metadata MD to the latest version by performing journal replay to update the metadata MD using the journal data JD stored in the non-volatile memory device 1230.

The meta write logic 1218 may program the data of the meta write buffer 1256 composed by the meta updater 1214 into the meta area 1231a of the non-volatile memory device 1230. When the journal buffer 1252 is in a full state, the meta write logic 1218 may combine the journal data JD accumulated in the journal buffer 1252 and the metadata MD accumulated in the metadata buffer 1254 to compose the meta write buffer 1256. The operation of configuring the meta write buffer 1256 by combining journal data JD and metadata MD for programming to the non-volatile memory device 1230 may be referred to as journal composition.

The meta write logic 1218 may program data composed in the meta write buffer 1256 into the meta area 1231a of the non-volatile memory device. For example, in the case of a range-type journal in which journal replay takes a relatively long time, the meta write logic 1218 may perform journal composition for journal data JD exceeding a certain address range even if the journal buffer 1252 is not full. A representative example of the range-type journal may be a trim journal. As such, in the case of a trim journal, if the trim journal exceeds a standard size (e.g., two (2) gigabytes (GB)), journal composition may be executed in the meta write buffer 1256 even if the journal buffer 1252 is not full, and then the program operation to the non-volatile memory device 1230 may be performed.

The non-volatile memory device 1230 may include a meta area 1231a where metadata MD and journal data JD are stored, and a user area 1231b where user data is stored. User data requested to be written by the storage controller 1210 may be stored in the user area 1231b. Alternatively or additionally, metadata MD and journal data JD composed in the meta write buffer 1256 may be programmed in stripe units in the meta area 1231a.

Data requested to be written may be temporarily stored in the buffer memory 1250. Data to be read from the non-volatile memory device 1230 and transmitted to the host 1100 may also be temporarily stored in the buffer memory 1250. For example, the buffer memory 1250 may include a journal buffer 1252 and a metadata buffer 1254 configured by the meta updater 1214. Additionally, a meta write buffer 1256 managed by the meta write logic 1218 may be composed in the buffer memory 1250.

Journal data JD corresponding to changes and/or update information to metadata may be recorded in the journal buffer 1252. Metadata MD generated through memory management operations may be stored in the metadata buffer 1254. For example, information related to a mapping table for mapping logical addresses and physical addresses may be stored in the metadata buffer 1254. Metadata MD and journal data JD to be programmed in the non-volatile memory device 1230 may be composed in the meta write buffer 1256. Although the buffer memory 1250 has been described as including the journal buffer 1252, the metadata buffer 1254, and the meta write buffer 1256, the present disclosure is not limited thereto. It may be understood that these buffers may be configured in the internal memory and/or cache memory of the storage controller 1210. The buffer memory 1250 may be composed of, for example, synchronous dynamic random access memory (SDRAM).

According to the storage device 1200 described above, the meta manager 1212 may skip replay of journals in the overlapping address range when performing a replay operation for journals in the range type such as the trim journal. For this function, the journal replayer 1216 of the meta manager 1212 may configure a trim table before starting journal replay. Additionally, the journal replayer 1216 may skip replay for overlapping trim ranges using trim bits bTrimmed allocated for each logical address range of the trim table. As a result, the time required to replay journals in the form of address ranges, such as trim journals, during reset or power-on reset (POR) operations may be significantly reduced, when compared to related storage devices. Accordingly, the open time of the storage device may be reduced during power-on reset (POR) and/or booting.

FIG. 3 is a block diagram showing the structure of the non-volatile memory device shown in FIG. 2, according to an embodiment. Referring to FIG. 3, the structure of the non-volatile memory device 1230 may be implemented as a flash memory device. The non-volatile memory device 1230 may include a cell array 1231, a row decoder 1232, a page buffer circuit 1233, a control logic circuit 1234, and a voltage generator 1235. The non-volatile memory device 1230 may further include a data input/output (I/O) circuit and/or an I/O interface. Additionally, the non-volatile memory device 1230 may further include components such as column logic, a pre-decoder, a temperature sensor, a command decoder, an address decoder, or the like.

The cell array 1231 may include a plurality of memory blocks. Each of the plurality of memory blocks may include a plurality of memory cells. A plurality of memory blocks may be included in one memory plane, however, the present disclosure is not limited thereto. The cell array 1231 may be connected to the page buffer circuit 1233 through bit lines BL, row decoder 1232 through word lines WL, string select lines SSL, and ground select lines GSL. In an example embodiment, the cell array 1231 may include a three-dimensional (3D) memory cell array. The cell array 1231 may include a meta area 1231a where metadata and journal data may be stored and a user area 1231b where user data may be stored. User data requested to be written by the storage controller 1210 may be stored in the user area 1231b. Alternatively or additionally, metadata and journal data configured in the meta write buffer 1256 may be programmed in stripe units in the meta area 1231a.

The row decoder 1232 may select one of the memory blocks of the cell array 1231 in response to the address ADDR. The row decoder 1232 may select one of the word lines WL of the selected memory block in response to the address ADDR. The row decoder 1232 may deliver a voltage VWL corresponding to the operation mode to the word line WL of the selected memory block. During a program operation, the row decoder 1232 may transmit the program voltage and/or verification voltage to the selected word line WL and the pass voltage to the unselected word line WL. During a read operation, the row decoder 1232 may delivery a read voltage to the selected word line WL and a read pass voltage to the unselected word line WL.

The page buffer circuit 1233 may include a plurality of page buffers (e.g., a first page buffer PB0, a second page buffer PB1, to an (n−1)th page buffer PBn−1, hereinafter generally referred to as "PB"). The plurality of page buffers PB may be respectively connected to memory cells through a plurality of bit lines BLs. The page buffer circuit 1233 may select at least one bit line from among the plurality of bit lines BLs in response to the column address. The page buffer circuit 1233 may operate as a write driver and/or a sense amplifier depending on the operation mode. For example, during a program operation, the page buffer circuit 1233 may apply a bit line voltage corresponding to data to be programmed to the selected bit line BL. During a read operation, the page buffer circuit 1233 may detect data stored in a memory cell by detecting the current or voltage of the selected bit line BL.

The control logic circuit 1234 may generally control various operations within the non-volatile memory device 1230. The control logic circuit 1234 may program (write) data into the cell array 1231 and/or may read data from the cell array 1231 in response to a command CMD, and/or an address ADDR. Alternatively or additionally, various control signals for erasing data stored in the cell array 1231 may be output. For example, the control logic circuit 1234 may output a voltage control signal VTG_C, the address ADDR, or the like. In an exemplary embodiment, the control logic circuit 1234 may output control signals for programming multi-bit data according to the received control signal, command CMD, and/or address ADDR.

The voltage generator 1235 may generate various types of voltages to perform program, read, and/or erase operations based on the voltage control signal VTG_C. For example, the voltage generator 1235 may generate a program voltage, a read voltage, and/or a program verification voltage as the word line voltage VWL. As another example, the program voltage may be generated using an incremental step pulse program (ISPP) scheme.

Figure 4:
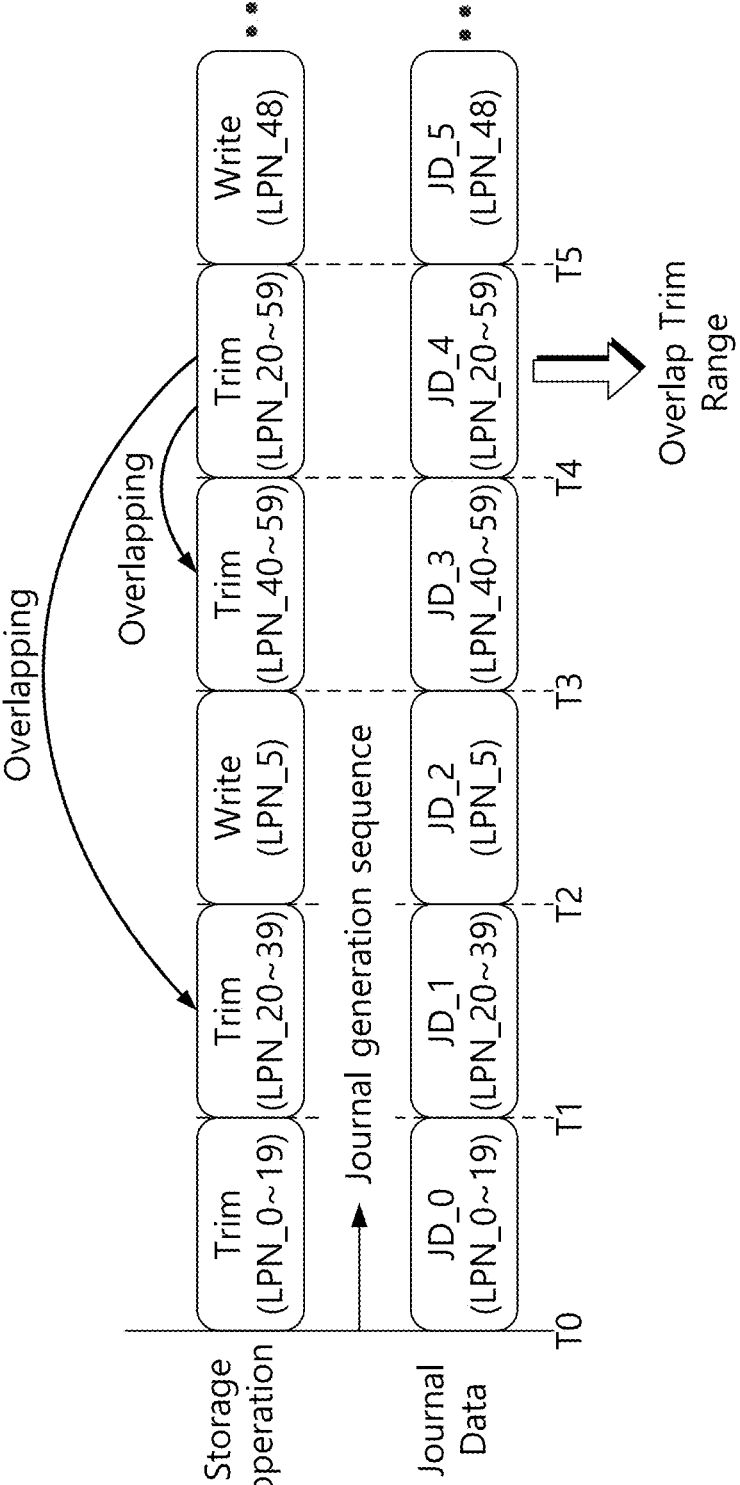
FIG. 4 is a diagram exemplarily showing a journal data creation operation of the meta updater of FIG. 2, according to an embodiment.

FIG. 4 is a diagram exemplarily showing a journal data creation operation of the meta updater of FIG. 2, according to an embodiment. Referring to FIG. 4, the meta updater 1214 may generate metadata MD and journal data JD according to the operation of the storage device 1200. Hereinafter, it may be assumed that the storage device 1200 performs a trim operation and a write operation in response to a request from the host 1100. The trim operation may be triggered by a trim command for security settings of the host 1100. The trim command may generally target a memory area corresponding to a range of logical addresses.

In response to a trim request for the selected area, the storage device 1200 may update metadata MD for logical addresses to be trimmed. For example, the storage device 1200 may perform processing such as mapping out an address range that is a trimming target in a mapping table. The trim operation may include an operation for forcibly deleting or erasing user data stored in the storage device 1200, such as, but not limited to, an operating system format, sanitize operation, or secure erase operation. During a write operation, the storage device 1200 may update metadata MD for the logical address to be written. That is, the physical address to be written to may be newly generated and/or updated in the mapping table. In addition, journal data JD may be generated according to changes or updates to metadata MD. For convenience of explanation, hereinafter, the expression of metadata MD according to storage operation may be omitted and only the generation of journal data JD may be shown.

At time T0, the storage device 1200 may perform the trim operation on the logical address range LPN_0 to LPN_19 and generate journal data JD_0 corresponding thereto. The trim operation for the logical address range LPN_0 to LPN_19 may be, for example, a process of mapping out the area corresponding to the logical address range LPN_0 to LPN_19 in the mapping table. That is, metadata MD such as the mapping table may be changed or updated by the trim operation. For example, the meta updater 1214 may generate journal data JD_0 in the form of a range corresponding to a change in metadata MD of the logical address range LPN_0 to LPN_19 according to the trim operation.

At time T1, the storage device 1200 may perform the trim operation on the logical address range LPN_20 to LPN_39 at the request of the host 1100 and generate journal data JD_1 corresponding thereto. The trim operation for the logical address range LPN_20 to LPN_39 may be, for example, a process of mapping out the area corresponding to the logical address range LPN_20 to LPN_39 in the mapping table. Metadata MD, such as a mapping table, may be updated by the trim operation. The meta updater 1214 may generate journal data JD_1 in the form of a range for updating metadata MD of the logical address range LPN_20 to LPN_39 according to the trim operation.

At time T2, the storage device 1200 may perform a write operation on the logical address LPN_5 according to a request from the host 1100 and generate journal data JD_2 corresponding thereto. In the case of the non-volatile memory device 1230 being implemented as a flash memory device, overwriting may not be possible. Consequently, according to the write operation of the logical address LPN_5, the physical address mapped to the logical address may be changed and/or newly generated. A change in the mapping table or an update of metadata MD may occur due to a write operation of the logical address LPN_5. The meta updater 1214 may update the metadata MD corresponding to the logical address LPN_5 according to the write operation and generate the corresponding journal data JD_2. In an embodiment, the logical address LPN_5 corresponding to the write operation may be provided as a single unit logical address rather than a range address. One logical address unit LPN may consist of, for example, four (4) or eight (8) sectors. However, the present disclosure is not limited in this regard.

At time T3, the storage device 1200 may perform a trim operation on the logical address range LPN_40 to LPN_59 at the request of the host 1100 and generate journal data JD_3 corresponding thereto. The trim operation for the logical address range LPN_40 to LPN_59 may be, for example, a process of mapping out the area corresponding to the logical address range LPN_40 to LPN_59 in the mapping table. Metadata MD, such as a mapping table, may be updated by the trim operation. The meta updater 1214 may generate journal data JD_3 in the form of a range corresponding to the update of metadata MD in the logical address range LPN_40 to LPN_59 according to the trim operation.

At time T4, the storage device 1200 may perform a trim operation on the logical address range LPN_20 to LPN_59 at the request of the host 1100. The meta updater 1214 may generate metadata MD and journal data JD_4 corresponding to the trim operation. The trim operation for the logical address range LPN_20 to LPN_59 may be, for example, a process of mapping out the area corresponding to the logical address range LPN_20 to LPN_59 in the mapping table. However, at time T1, the trim journal for the logical address range LPN_20 to LPN_39 may have already been generated. And at time T3, the trim journal for the logical address range LPN_40 to LPN_59 may have already been generated. In addition, the logical address range LPN_20 to LPN_59 of the journal data JD_4 may overlap with the logical address ranges LPN_20 to LPN_39 and LPN_40 to LPN_59 of the journal data JD_1 and JD_3. In such a case, when a power error occurs and the journal replay occurs, replays for the logical address range LPN_20 to LPN_59 of the journal data JD_4 may be executed in duplicate. In the present disclosure, a journal replay skip function may be provided for journal data JD_4 in the overlapping logical address range LPN_20 to LPN_59.

At time T5, the storage device 1200 may perform a write operation on the logical address LPN_48 according to a request from the host 1100 and generate journal data JD_5 corresponding thereto. A change in the mapping table or an update in metadata MD occurs due to the write operation of the logical address LPN_48. The meta updater 1214 may update the metadata MD corresponding to the logical address LPN_48 according to the write operation and generate the corresponding journal data JD_5.

As described above, when a plurality of journal data JD_0 to JD_5 is generated, the storage controller 1210 may sequentially perform replay of the plurality of journal data JD_0 to JD_5 to recover the metadata MD. For example, the journal replayer 1216 of the storage controller 1210 may update metadata MD corresponding to the logical address range LPN_0 to LPN_19 based on the journal data JD_0. Afterwards, the journal replayer 1216 may perform journal replay to update metadata MD corresponding to the logical address range LPN_20 to LPN_39 based on the journal data JD_1. Likewise, the journal replayer 1216 may perform journal replay to update metadata MD corresponding to the logical address LPN_5 based on the journal data JD_2. The journal replayer 1216 may perform journal replay to update metadata MD corresponding to the logical address range LPN_40 to LPN_59 based on the journal data JD_3.

Alternatively or additionally, the journal replayer 1216 may skip journal replay of journal data JD_4 in the logical address range LPN_20 to LPN_59. The journal replayer 1216 may skip the journal replay based on the logical address range LPN_20 to LPN_59 of the journal data JD_4 overlapping with the logical address range of the journal data JD_1 and JD_3 corresponding to the previous trim journals. According to the redundant replay skip function of the trim journal, the time required for replay may be significantly reduced when compared to a related storage device. Accordingly, the open time of the storage device during power-on reset (POR) and/or booting may be reduced.

Figure 5:
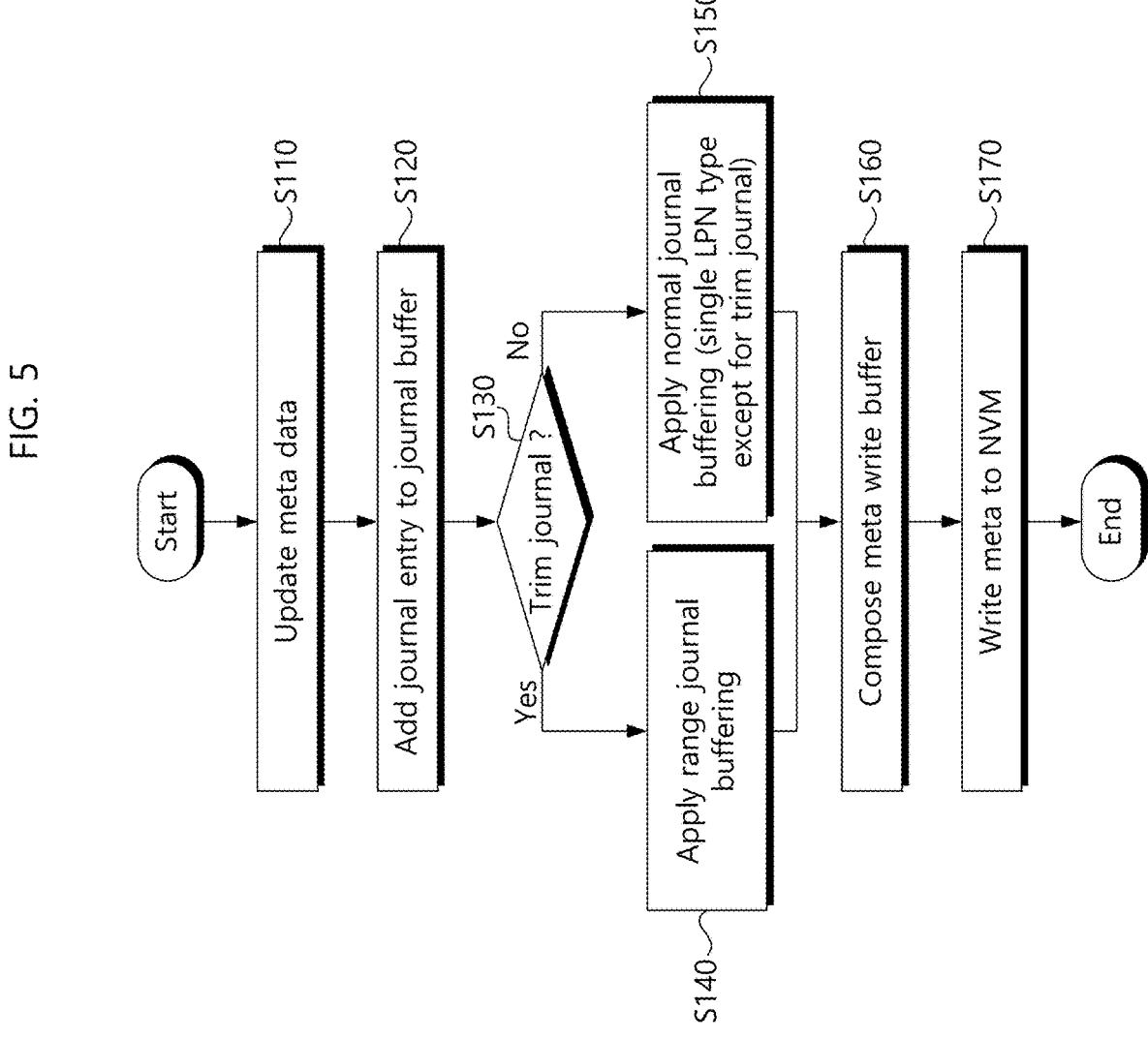
FIG. 5 is a flowchart exemplarily showing the metadata generation procedure, according to an embodiment.

FIG. 5 is a flowchart exemplarily showing the metadata generation procedure, according to an embodiment. Referring to FIG. 5, the meta manager 1212 may generate metadata MD and journal data JD according to the operation of the storage device 1200 and may compose the meta write buffer 1256.

In operation S110, the meta updater 1214 of the meta manager 1212 may generate metadata and updates the metadata in the metadata buffer 1254. Metadata may be generated from address mapping of user data and/or various memory management operations such as, but not limited to, wear leveling.

In operation S120, the meta updater 1214 may generate journal data corresponding to the metadata stored in the metadata buffer 1254. The meta updater 1214 may write the generated journal data into the journal buffer 1252.

In operation S130, the meta manager 1212 may check whether the journal data written in the journal buffer 1252 is a trim journal. If the journal data written in the journal buffer 1252 is a trim journal (Yes in operation S130), the procedure may move to operation S140. Alternatively, if the journal data written in the journal buffer 1252 is not a trim journal (No in operation S130), the procedure may move to operation S150.

In operation S140, the meta manager 1212 may apply range journal buffering to store added journal data in the journal buffer 1252. Range journal buffering may refer to a method of storing a journal with an address range type of journal data in the journal buffer 1252. For example, according to range journal buffering, if the address range of the trim journal written to the journal buffer 1252 exceeds the reference range, the meta write buffer 1256 may be composed even if the journal buffer 1252 is not full.

In operation S150, the meta manager 1212 may apply normal journal buffering to store journal data in the journal buffer 1252. Normal (or general) journal buffering may refer to a method of storing journal data in the form of a single logical address LPN in the journal buffer 1252. In such a case, the meta write buffer 1256 may be composed according to the full standard of the journal buffer 1252. That is, according to a normal (or general) journal buffering method, the meta write buffer 1256 may be composed when the amount of journal data accumulated in the journal buffer 1252 is full.

In operation S160, the meta write logic 1218 may compose the meta write buffer 1256 according to the determined composition method. The meta write logic 1218 may combine the corresponding journal data and metadata from the journal buffer 1252 and the metadata buffer 1254 to form the meta write buffer 1256.

In operation S170, the meta write logic 1218 may program the meta write unit composed in the meta write buffer 1256 into the meta area 1231a of the non-volatile memory device 1230.

Above, the metadata management method performed in the storage device 1200 has been described.

Figure 6:
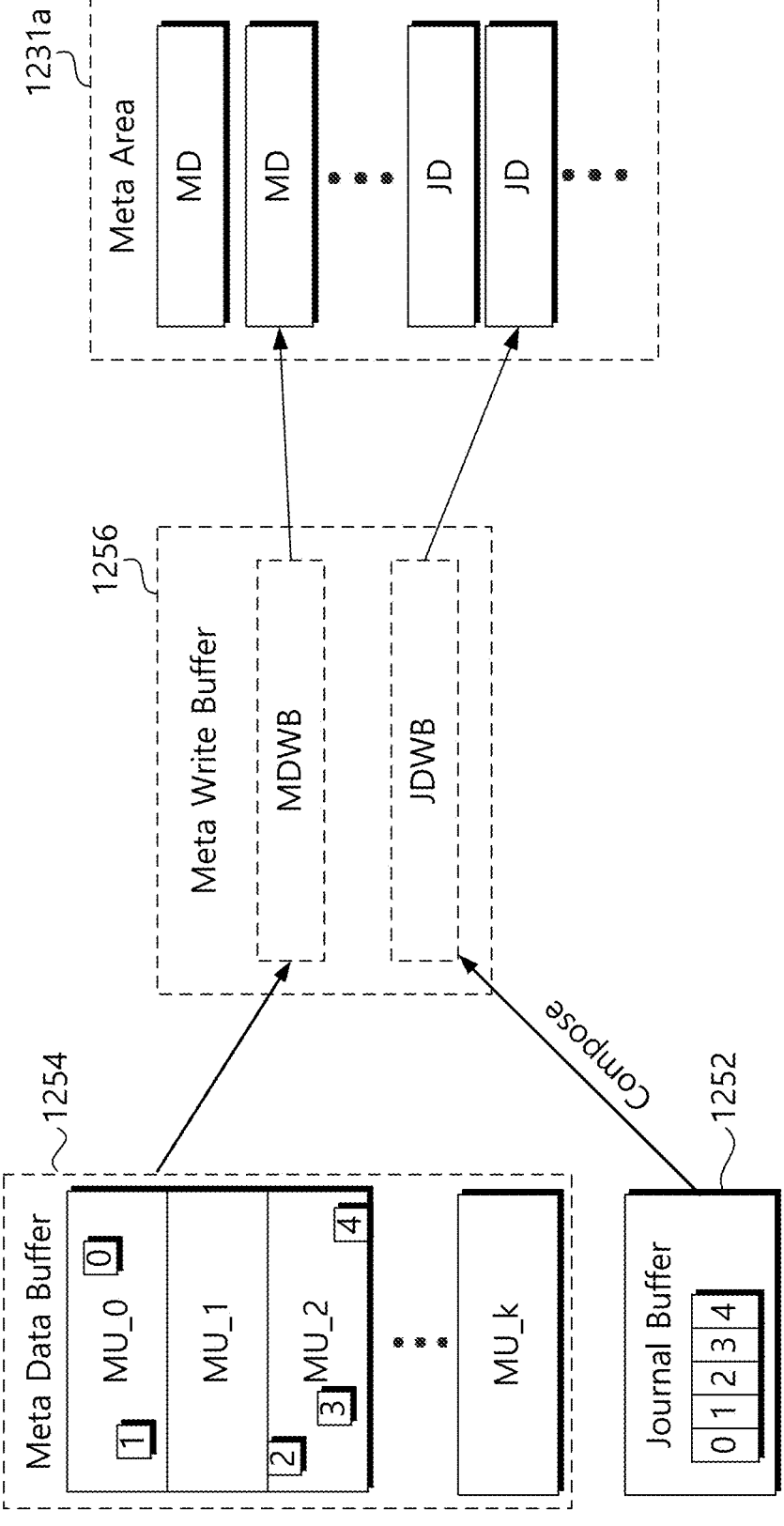
FIG. 6 is a diagram illustrating the journal composition method described in FIG. 5, according to an embodiment.

FIG. 6 is a diagram illustrating the journal composition method described in FIG. 5, according to an embodiment. Referring to FIG. 6, when the meta updater 1214 determines that the journal data added to the journal buffer 1252 is in the full state, the meta manager 1212 may compose the meta write buffer 1256. The meta manager 1212 may program the journal data JD and metadata MD composed in the meta write buffer 1256 into the meta area 1231a of the non-volatile memory device 1230.

The meta manager 1212 may check whether the journal buffer 1252 is in a full state due to writing of journal data. In the case of an address range type journal such as a trim journal, the range journal buffering method may be applied to determine whether the journal buffer 1252 is in a full state. For example, for a journal in the address range format, the journal data write buffer JDWB may be formed if the address range of the journal written in the journal buffer 1252 exceeds the reference range. Alternatively, if the journal is not in the address range format, the journal buffer 1252 may need to be full to form the journal data write buffer JDWB.

Once the meta write buffer 1256 is composed, the meta write logic 1218 may program the composed journal data JD and metadata MD into the meta area 1231a of the non-volatile memory device 1230.

In the above-described manner, the full state of the journal buffer 1252 may be identified, and the journal data of the journal buffer 1252 in the full state may form the meta write buffer 1256. The journal data JD and metadata MD of the meta write buffer 1256 may be programmed into the non-volatile memory device 1230. This operation may be performed in sudden power-off (SPO) situations.

Figure 7:
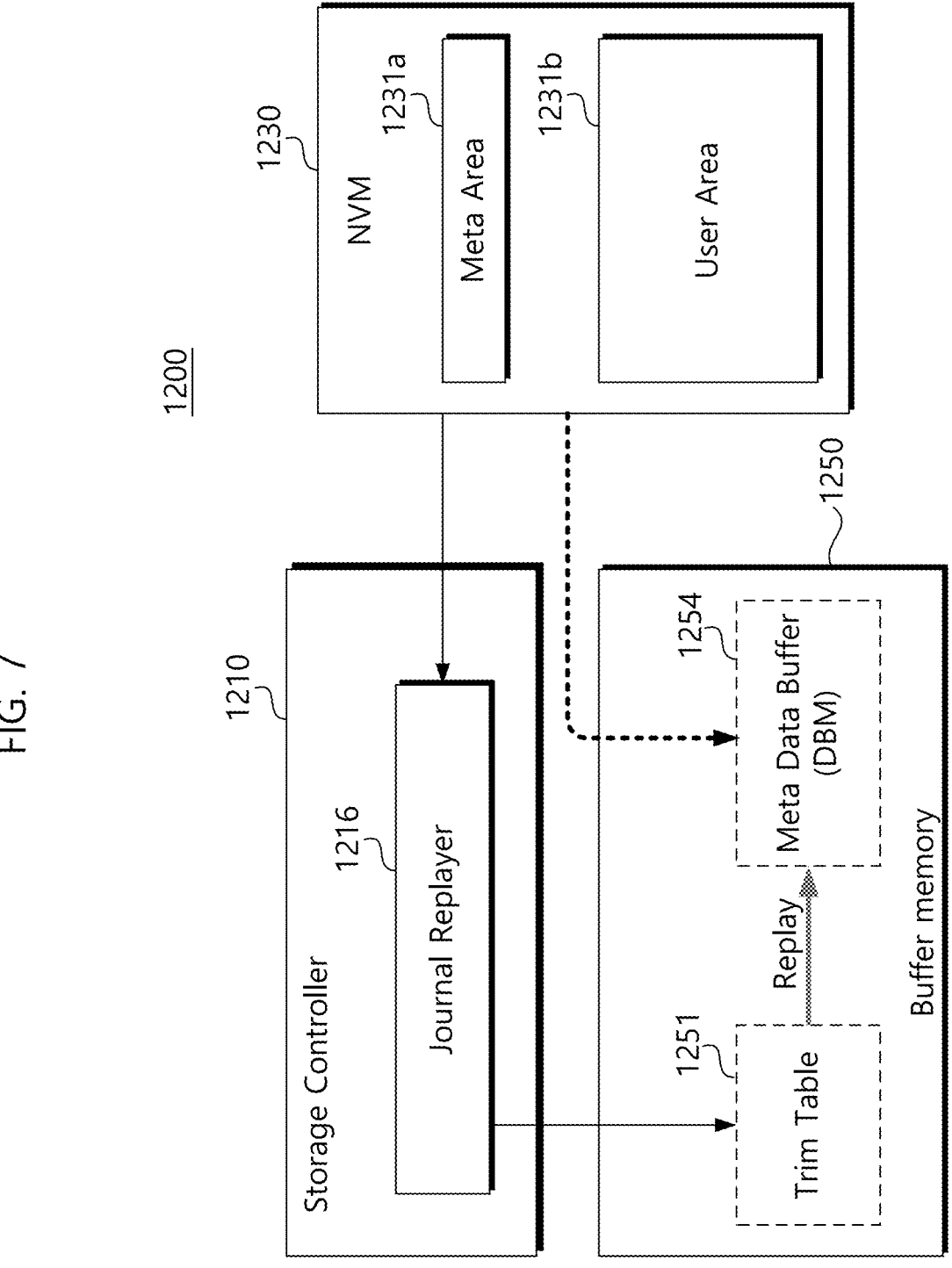
FIG. 7 is a block diagram exemplarily showing a journal replay operation performed by the journal replayer, according to an embodiment.

FIG. 7 is a block diagram exemplarily showing a journal replay operation performed by the journal replayer, according to an embodiment. Referring to FIG. 7, when the storage device 1200 is turned on after sudden power-off (SPO), the journal replayer 1216 may restore the metadata MD backed up in the non-volatile memory device 1230 in the buffer memory 1250. And the journal replayer 1216 may perform journal replay using journal data JD to update metadata MD. In addition, the journal replayer 1216 may generate and use the trim table 1251.

When the storage device 1200 is powered on after a sudden power-off (SPO), the journal replayer 1216 may retrieve the metadata MD stored in the non-volatile memory device 1230 and may store the metadata buffer 1254 of the buffer memory 1250 during the booting period. Thereafter, the journal replayer 1216 may be configured to sequentially retrieve the journal data JD backed up in the meta area 1231a of the non-volatile memory device 1230.

The journal replayer 1216 may generate an initialized trim table 1251 before starting replay using journal data JD. The journal replayer 1216 may determine whether the address ranges of trim journals executed sequentially overlap based on the trim table 1251. That is, the journal replayer 1216 may determine whether the trim journal is overlapped according to the logical value of the trim bit bTrimmed updated in the trim table 1251 during a sequential replay operation of the trim journal or write journal. The trim bit bTrimmed of the trim table 1251 may be set and/or reset when replay of the trim journal or write journal is completed.

For example, the trim bit bTrimmed of the first trim journal TJ_1 having the address range LPN_0 to LPN_19 may have an initial value of a clear state (e.g., logic '0' or 'low'). However, when replay for the first trim journal TJ_1 is completed, the trim bit bTrimmed of the first trim journal TJ_1 may be set to the set state (e.g., logic '1' or 'high'). After replay of the first trim journal TJ_1, when the write trim corresponding to the logical address LPN_15 included in the address range LPN_0 to LPN_19 is replayed, the trim bit bTrimmed of the logical address LPN_15 may be cleared again to the clear state. That is, the journal replayer 1216 may set the trim bit bTrimmed for the address range LPN_0 to LPN_14 of the trim table 1251 to the set state, may set the trim bit bTrimmed of the logical address LPN_15 to the clear state, and may set the trim bit bTrimmed of the address range LPN_16-LPN_19 to the set state.

Hereafter, it may be assumed that the second trim journal TJ_2 in the address range LPN_0 to LPN_14 is replayed. Then, the journal replayer 1216 may check the trim bit bTrimmed corresponding to the address range LPN_0 to LPN_14 of the trim table 1251. Since the trim bit bTrimmed corresponding to the address range LPN_0 to LPN_14 of the second trim journal TJ_2 of the trim table 1251 may be set to the set state, the journal replayer 1216 may skip the journal replay operation of the second trim journal TJ_2.

In the manner described above, the journal replayer 1216 may skip redundant replay for the trim journal. Accordingly, the open time of the storage device 1200 that may occur when the storage device 1200 is powered on after repeating the operating system (OS) format and/or security format may be reduced, when compared to a related storage device.

FIG. 8 is a diagram illustrating the trim table of FIG. 7, according to an embodiment. Referring to FIG. 8, the journal replayer 1216 may generate and may update a trim table for replay of the trim journal or write journal.

The journal replayer 1216 may generate a trim table with initialized trim bit bTrimmed values before starting journal replay for metadata MD. Alternatively, the journal replayer 1216 may generate and manage a trim table in which the trim bits bTrimmed are updated according to the journal sequence JNL_SEQ while performing journal replay for metadata MD. Trim bits bTrimmed may be first provided in a clear state (e.g., logic '0' or 'low') at the time of initial creation. When the trim journal for the corresponding logical address range is provided, the journal replayer 1216 may set the trim bit bTrimmed to the set state (e.g., logic '1' or 'high') and perform journal replay. Alternatively, the journal replayer 1216 may set the corresponding trim bit bTrimmed to the set state after performing journal replay.

The execution order of journal replay may follow the journal sequence JNL_SEQ corresponding to the journal generation order. First, journal replay of the address range LPN_0 to LPN_19 corresponding to the journal sequence JNL_SEQ '0' may be performed. After journal replay is performed, the trim bit bTrimmed corresponding to the journal sequence JNL_SEQ 'O' of the trim table may be set to the set state. In addition, the delete bitmap DBM of the metadata MD corresponding to the address range LPN_0 to LPN_19 in the journal replay may be set to the set state (e.g., logic '1' or 'high').

Subsequently, journal replay of the address range LPN_20 to LPN_39 corresponding to the journal sequence JNL_SEQ '1' may be performed. When journal replay is completed, the trim bit bTrimmed corresponding to the journal sequence JNL_SEQ '1' of the trim table may be set to the set state. By journal replay, the delete bitmap DBM of the metadata MD corresponding to the address range LPN_20 to LPN_39 may be set to the set state.

In such a manner, journal replay may be performed by referring to the trim bit bTrimmed for each logical address range in the order of the journal sequence JNL_SEQ. For example, if redundant journal replay may need to be performed for a logical address range for which the trim bit bTrimmed is already set to the set state, the journal replay may be omitted and/or skipped by referring to the trim bit bTrimmed value.

Figure 9:
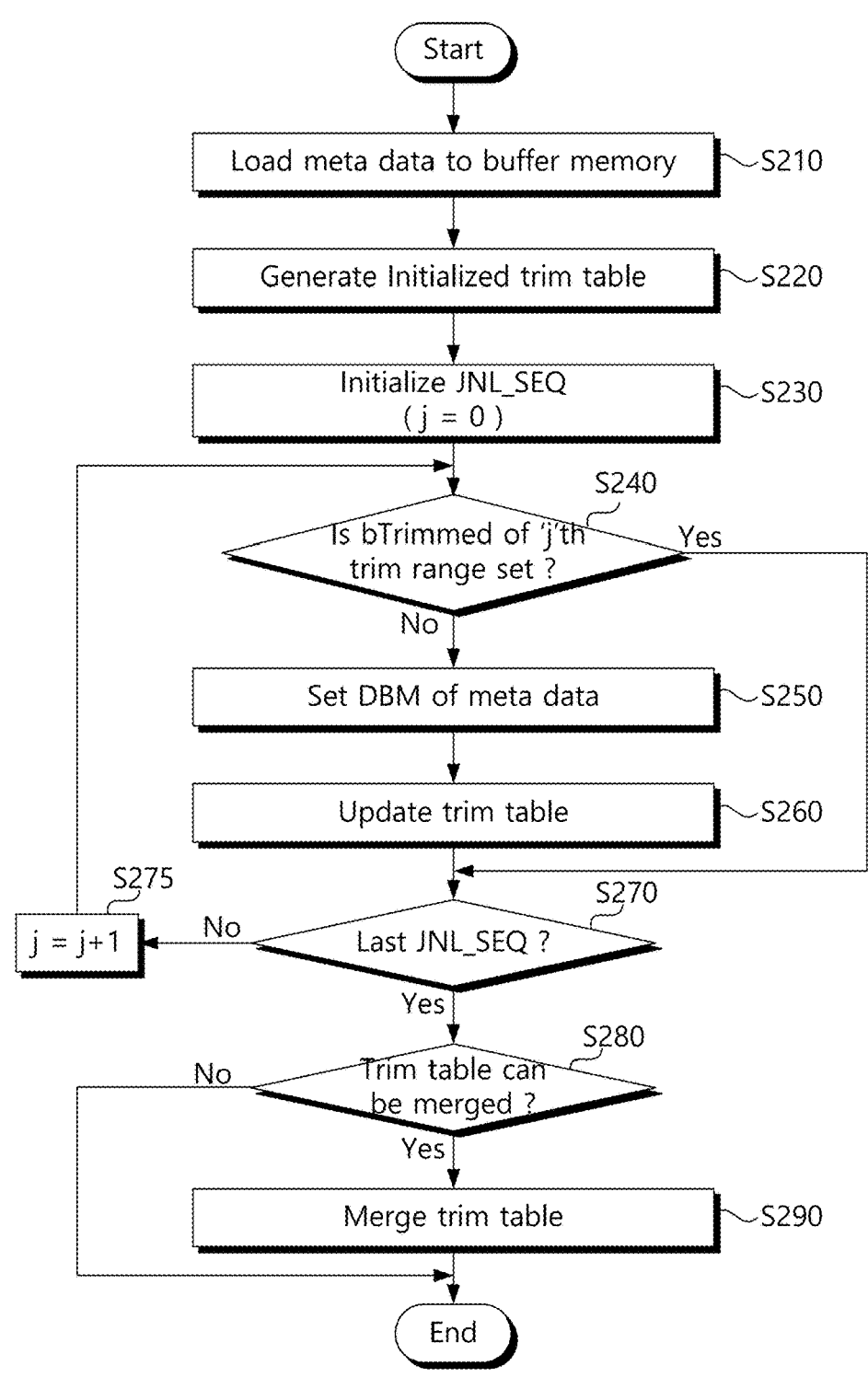
FIG. 9 is a flowchart showing the journal replay method that may skip redundant replays, according to an embodiment.

FIG. 9 is a flowchart showing the journal replay method that may skip redundant replays, according to an embodiment. Referring to FIG. 9, the meta manager 1212 or the journal replayer 1216 may perform metadata restoration and journal replay during a power-on reset (POR) operation.

In operation S210, the meta manager 1212 may read metadata MD from the meta area 1231a of the non-volatile memory device 1230 and may load the metadata MD into the buffer memory 1250. To update the metadata MD, journal data JD may also be read from the meta area 1231a.

In operation S220, the journal replayer 1216 may generate an initialized trim table. The journal replayer 1216 may generate a trim table for replay of the trim journal or the write journal. The generated trim table may have a trim bit bTrimmed value cleared to the initialized state (e.g., the clear state). That is, the trim bits bTrimmed for preset logical address ranges may be provided in a clear state (e.g., logic '0' or 'low') at the time of initial generation.

In operation S230, the journal sequence JNL_SEQ (e.g., j) corresponding to the journal replay order in the trim table may be initialized (e.g., j=0). The journal sequence JNL_SEQ may be a value corresponding to the temporal order of the journal replay operation performed by the journal replayer 1216.

In operation S240, the journal replayer 1216 may retrieve journal data JD in the address range corresponding to the journal sequence JNL_SEQ. For example, the journal replayer 1216 may read a journal in an address range corresponding to the journal sequence JNL_SEQ from among the journal data JD stored in the non-volatile memory device 1230. The journal replayer 1216 may check whether the trim bit bTrimmed corresponding to the recovered journal sequence JNL_SEQ is set (e.g., logic '1' or 'high') or cleared (e.g., logic 'O' or 'low'). If the trim bit bTrimmed corresponding to the journal sequence (j) is set (Yes in operation S240), the procedure may skip to operation S270 without journal replay. Alternatively, if the trim bit bTrimmed corresponding to the journal sequence JNL_SEQ is in the clear state (No in operation S240), the procedure may move to operation S250 to execute journal replay.

In operation S250, the journal replayer 1216 may perform journal replay which may set the delete bitmaps DBMs indicating the trim operation status assigned to the address range corresponding to the journal sequence JNL_SEQ of the metadata MD to the set state. That is, in the replay operation of the trim journal, the operation of setting the delete bitmap DBM of the corresponding address range of the metadata MD to the set state may be included in the replay.

In operation S260, the journal replayer 1216 may update the trim table to reflect the journal replay results applied in operation S250. For example, the journal replayer 1216 may set the trim bit bTrimmed of the address range corresponding to the journal sequence JNL_SEQ to the set state in the trim table.

In operation S270, the journal replayer 1216 may check whether the journal sequence JNL_SEQ corresponds to the final sequence (e.g., n−1) registered in the trim table. If the journal sequence JNL_SEQ is not the final sequence (No in operation S270), the procedure may move to operation S275. Alternatively, if the journal sequence JNL_SEQ corresponds to the final sequence registered in the trim table (Yes in operation S270), the procedure may move to operation S280.

In operation S275, the journal replayer 1216 may count up (e.g., increment) the journal sequence JNL_SEQ and return to operation S240. This operation loop may be repeated until the journal sequence JNL_SEQ reaches the final sequence registered in the trim table.

In operation S280, the journal replayer 1216 may check whether the trim table may be merged. For example, if two (2) or more journal sequences continuously have the same delete bitmap DBM, the address range of these journal data may be reconstructed into one journal sequence. If merging of trim tables is possible (Yes in operation S280), the procedure may move to operation S290. Alternatively, if merging of the trim table is not possible (No in operation S280), replay for journals registered in the trim table may end.

In operation S290, if there is an address range in the metadata MD set with consecutively identical delete bitmaps DBMs across two (2) or more journal sequences, the journal replayer 1216 may merge the address range as one journal sequence. Through merging of these trim tables, the journal replayer 1216 may maintain a more simplified trim table.

As described above, if there is an address range that has already been replayed in the previous journal replay step, replay for journals with overlapping address ranges may be skipped. Accordingly, the replay time for journal data may be reduced, which may result in a reduction in the open time of the storage device 1200, when compared to a related storage device.

Figure 10B:
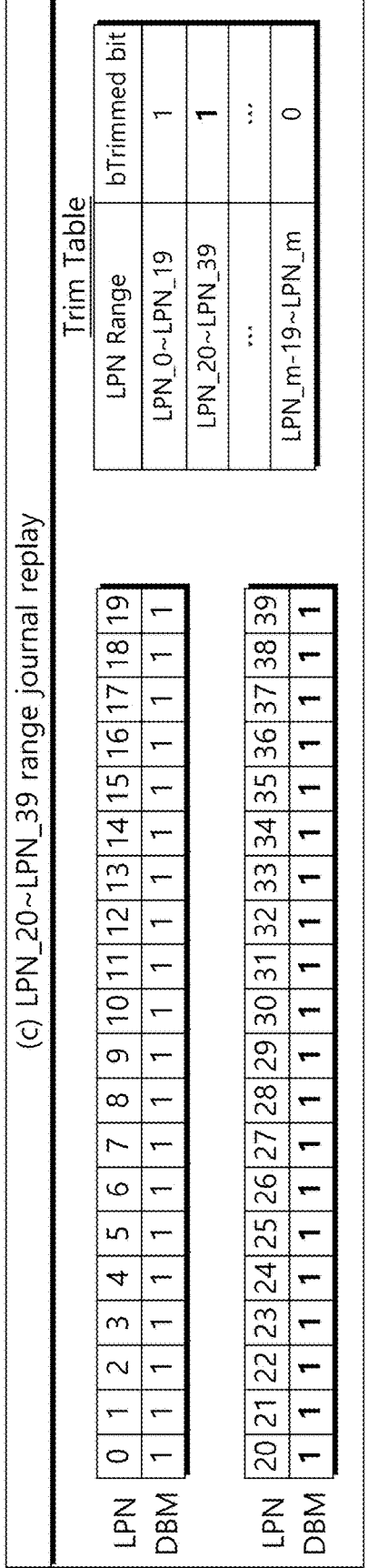
Figure 10B:
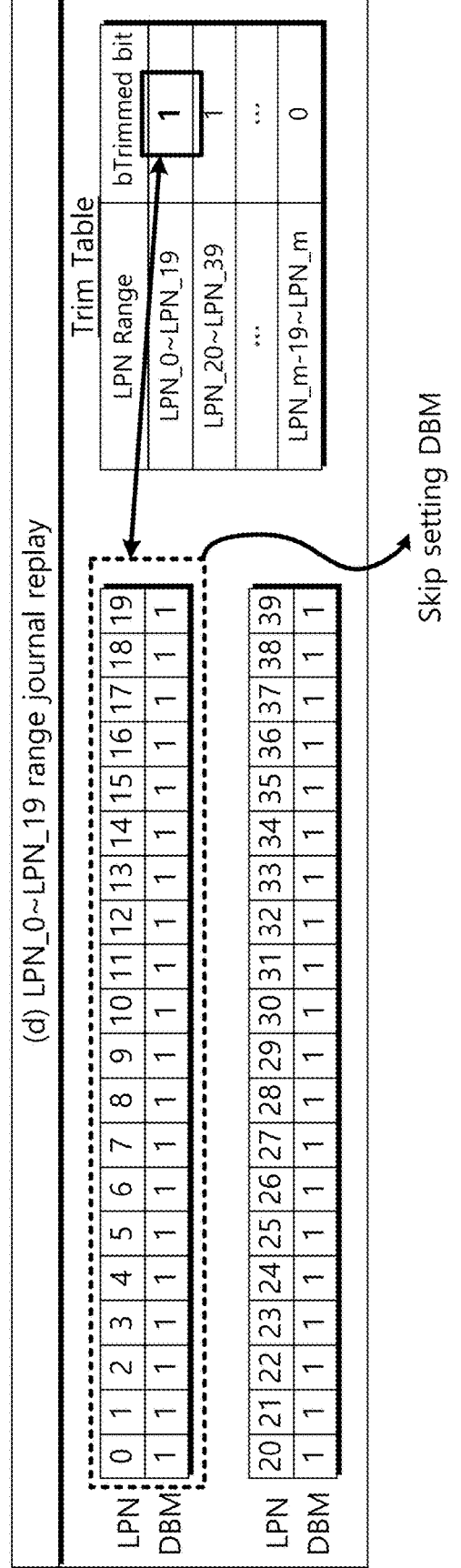

FIGS. 10A and 10B are tables sequentially showing the journal replay method, according to an embodiment. In FIGS. 10A and 10B, the trim bit bTrimmed of the trim table may be referenced in the replay of the trim journal. The trim table may be updated according to the progress of the journal replay. For convenience of description, the delete bitmap DBM of metadata MD and the corresponding trim table may be described limited to the logical address range LPN_0 to LPN_39.

Referring to FIG. 10A, a delete bitmap DBM and a corresponding trim table in the table state (a) (e.g., initial state) where journal replay starts are shown. Also, the delete bitmap DBM and the corresponding trim table in table state (b), which shows after journal replay for the logical address range LPN_0 to LPN_19 is performed, are shown.

In table state (a) of FIG. 10A, the initial state delete bitmap DBM before journal replay is performed and the corresponding trim table are shown. In the initial state, the journal replayer 1216 may generate a trim table with an initialized trim bit bTrimmed value before starting journal replay for metadata MD. When metadata MD is loaded into the buffer memory 1250, the delete bitmap DBM in each unit of the logical address ranges (LPN_0 to LPN_19, LPN_20 to LPN_39, . . . , LPN_m-19 to LPN_m, where m is a positive integer greater than zero (0)) is cleared (e.g., initialized to logic '0' or 'low'). The trim bit bTrimmed corresponding to each of the logical address ranges (LPN_0 to LPN_19, LPN_20 to LPN_39, . . . , LPN_m-19 to LPN_m) may be provided in a clear state (e.g., logic '0' or 'low').

Table state (b) shows the status of the delete bitmap DBM and trim table after journal replay is performed for the logical address range LPN_0 to LPN_19. By executing the replay of the trim journal of the logical address range LPN_0 to LPN_19, the delete bitmap DBM of each logical address in the logical address range LPN_0 to LPN_19 is set to the set state (e.g., logic '1' or 'high'). The logical address LPN_i may cover, for example, a memory area in units of eight (8) sectors, where i is a positive integer greater than zero (0). However, the present disclosure is not limited in this regard. After setting the metadata delete bitmap DBM to the set state, the journal replayer 1216 may set the trim bit bTrimmed of the corresponding logical address range LPN_0 to LPN_19 to the set state.

Referring to FIG. 10B, table state (c) shows the state of the delete bitmap DBM and the corresponding trim table after journal replay for the logical address range LPN_20 to LPN_39. Continuing to refer to FIG. 10B, table state (d) shows the status of the delete bitmap DBM and the corresponding trim table in the redundant replay for the logical address range LPN_0 to LPN_19.

Table state (c) shows the status of the delete bitmap DBM and trim table after journal replay is performed for the logical address range LPN_20 to LPN_39. By executing the replay of the trim journal of the logical address range LPN_20 to LPN_39, the delete bitmap DBM of each logical address in the logical address range LPN_20 to LPN_39 is set to the set state. After setting the metadata delete bitmap DBM to the set state, the journal replayer 1216 may set the trim bit bTrimmed of the logical address range LPN_20 to LPN_39 to the set state.

Table state (d) shows the status of the delete bitmap DBM and trim table after journal replay is performed for the overlapping logical address range LPN_0 to LPN_19. The replay of the trim journal in the logical address range LPN_0 to LPN_19 may have already been performed by the previous replay of the trim journal, as shown in table state (a). Accordingly, the journal replayer 1216 may check the trim bit bTrimmed corresponding to the logical address range LPN_0 to LPN_19. The trim bit bTrimmed corresponding to the logical address range LPN_0 to LPN_19 may already be set (e.g., set to logic '1' or 'high'). Accordingly, the journal replayer 1216 may determine the trim journal corresponding to the logical address range LPN_0 to LPN_19 as a redundant trim journal and skip journal replay.

In such a manner, the journal replayer 1216 may skip journal replay of the overlapping address range using the trim bit bTrimmed managed in the trim table. Accordingly, the open time of the storage device 1200 that may occur when the storage device 1200 is powered on after repeating the operating system (OS) format or security format may be reduced, when compared to a related storage device.

Figure 11:
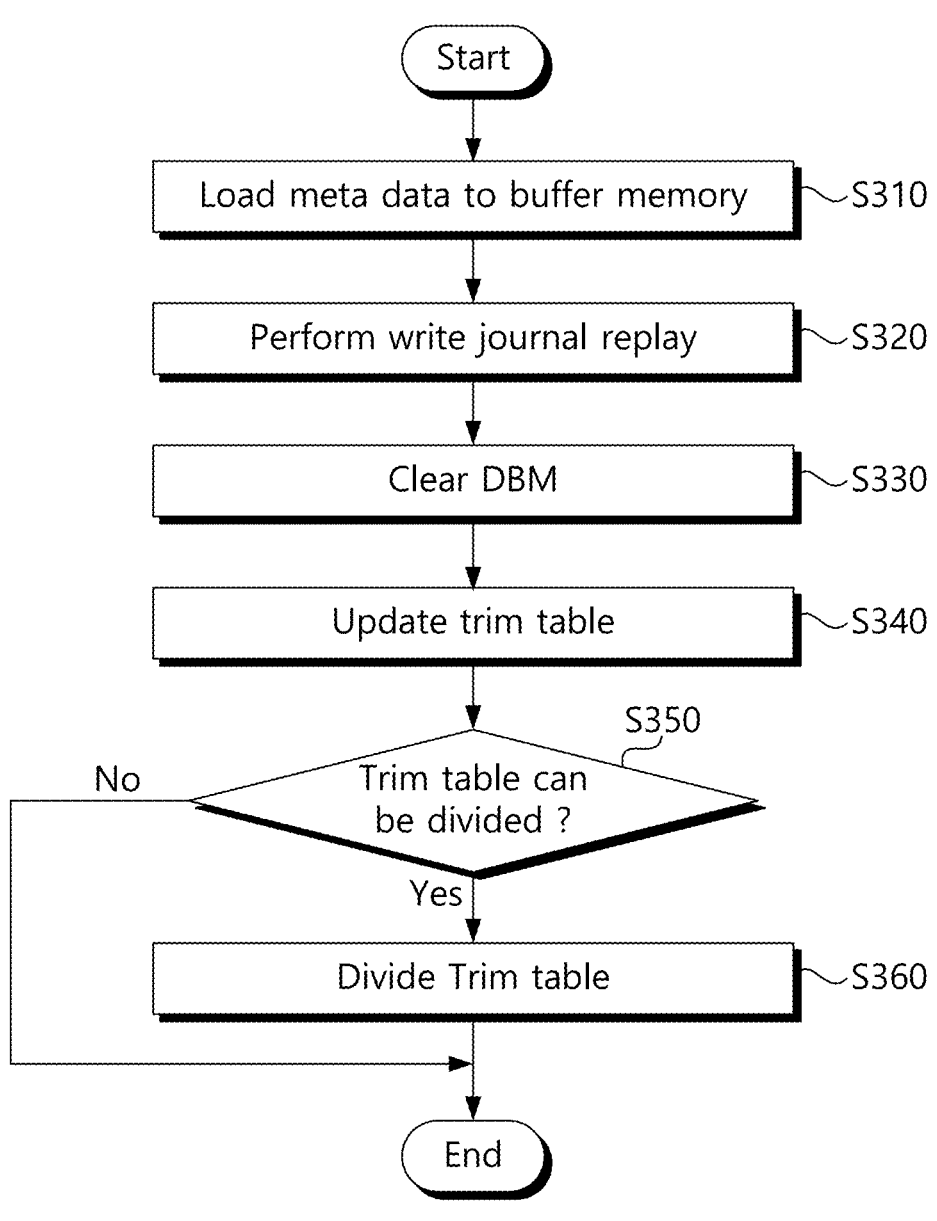
FIG. 11 is a flow chart illustrating the replay method of the write journal, according to an embodiment.

FIG. 11 is a flow chart illustrating the replay method of the write journal, according to an embodiment. Referring to FIG. 11, the meta manager 1212 or the journal replayer 1216 may perform a replay of the write journal to restore metadata during a power-on reset (POR) operation. In an embodiment, the trim table may be separated by replay of the write journal.

In operation S310, the meta manager 1212 may read metadata MD from the meta area 1231a of the non-volatile memory device 1230 and may load the metadata MD into the buffer memory 1250. Journal data may also be read from the meta area 1231a to update the metadata MD. The journal replayer 1216 may generate an initialized trim table. A journal replay operation by a trim journal may be performed, and a trim bit bTrimmed for the corresponding address range of the trim table may be set. The replay procedure for the trim journal may be similar in many respects and/or may be the same as described above with reference to FIG. 9.

In operation S320, the journal replayer 1216 may perform replay of the write journal. Unlike trim journals, write journals may not be range-type journals. Consequently, replay of the write journal may be performed in single LPN units rather than logical address ranges.

In operation S330, the journal replayer 1216 may clear the delete bitmap DBM of the corresponding logical address to the clear state for replay of the write journal.

In operation S340, the journal replayer 1216 may update the trim table to reflect the replay result of the write journal applied in operation S330. For example, in the trim table, the trim bit bTrimmed of the logical address LPN_5 corresponding to the replay of the write trim may be cleared to the clear state.

In operation S350, the journal replayer 1216 may check whether the trim table is separable. It may be assumed that the delete bitmaps DBM of the address range LPN_0 to LPN_19 and the trim bit bTrimmed of the trim table are updated to the set state by replay of the previous trim journal. In such a state, when replay of the write journal corresponding to the logical address LPN_5 is performed in operations S330 and S340, the delete bitmap DBM of the logical address LPN_5 may be cleared to the clear state.

Since the delete bitmap DBM of the logical address LPN_5 dividing the continuous address range LPN_0 to LPN_19 is cleared, the address range LPN_0 to LPN_19 may be separated. Therefore, in such a case, the trim bits bTrimmed of the address range LPN_0 to LPN_19 of the trim table may need to be divided. If division of the trim bit bTrimmed is possible (Yes in operation S350), the procedure may move to operation S360. Alternatively, if the trim bit bTrimmed of the trim table may not be divided (No in operation S350), the replay procedure for the write journal may be terminated.

In operation S360, the journal replayer 1216 may divide one bit of the trim table into two (2) or more trim bits. For example, the trim bit bTrimmed of the address range LPN_0 to LPN_19 set to the set state may be divided into three (3) trim bits according to the logical address range. That is, the trim bit bTrimmed corresponding to the logical address LPN_5 in the trim table may be cleared to the clear state. The trim bit bTrimmed of the address range LPN_0 to LPN_19 may be divided into the trim bit bTrimmed of the cleared logical address LPN_5, the trim bit bTrimmed in the set state corresponding to the first address range LPN_0 to LPN_4, and set state trim bits 'bTrimmed corresponding to the second address range LPN_6 to LPN_19.

As described above, one trim bit corresponding to the address range of the trim table may be divided into two (2) or more trim bits by replay of the write journal.

Figure 12A:
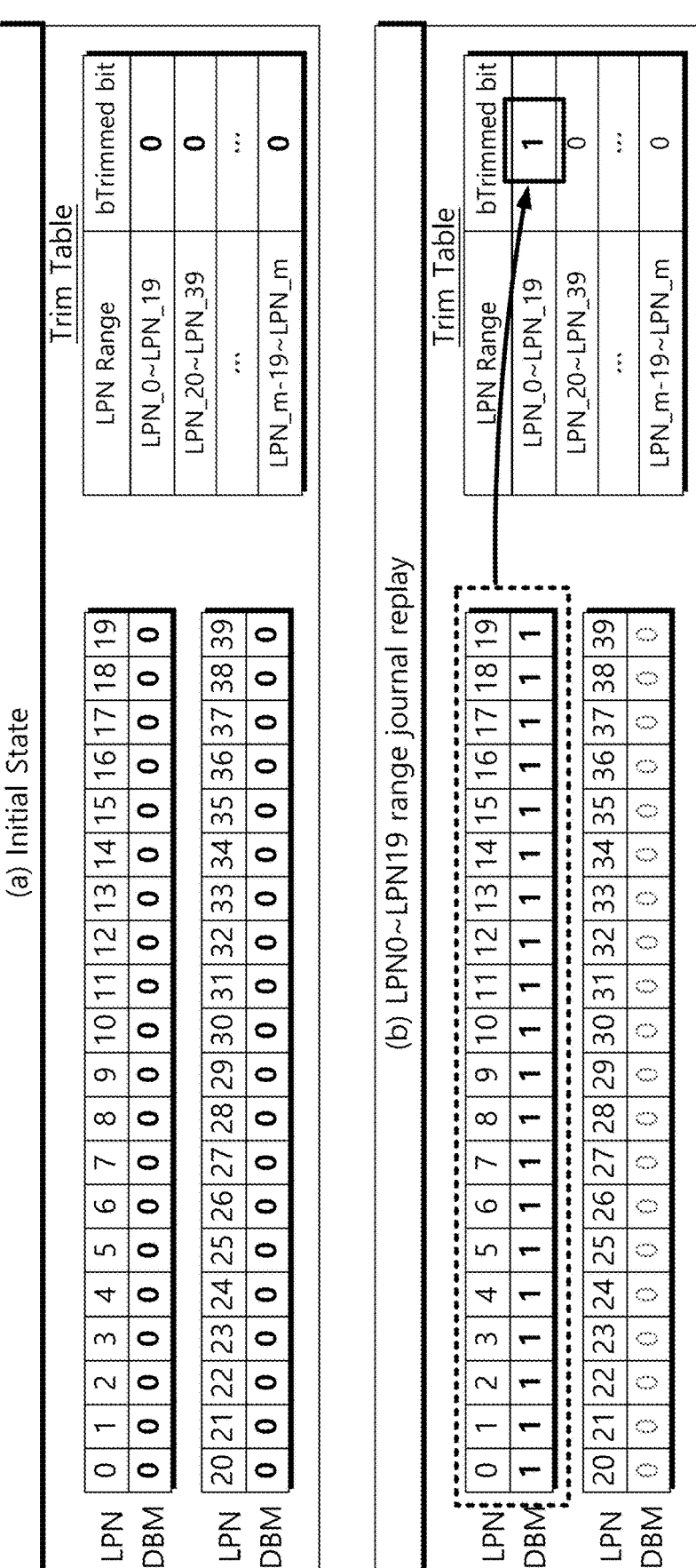
Figure 12B:
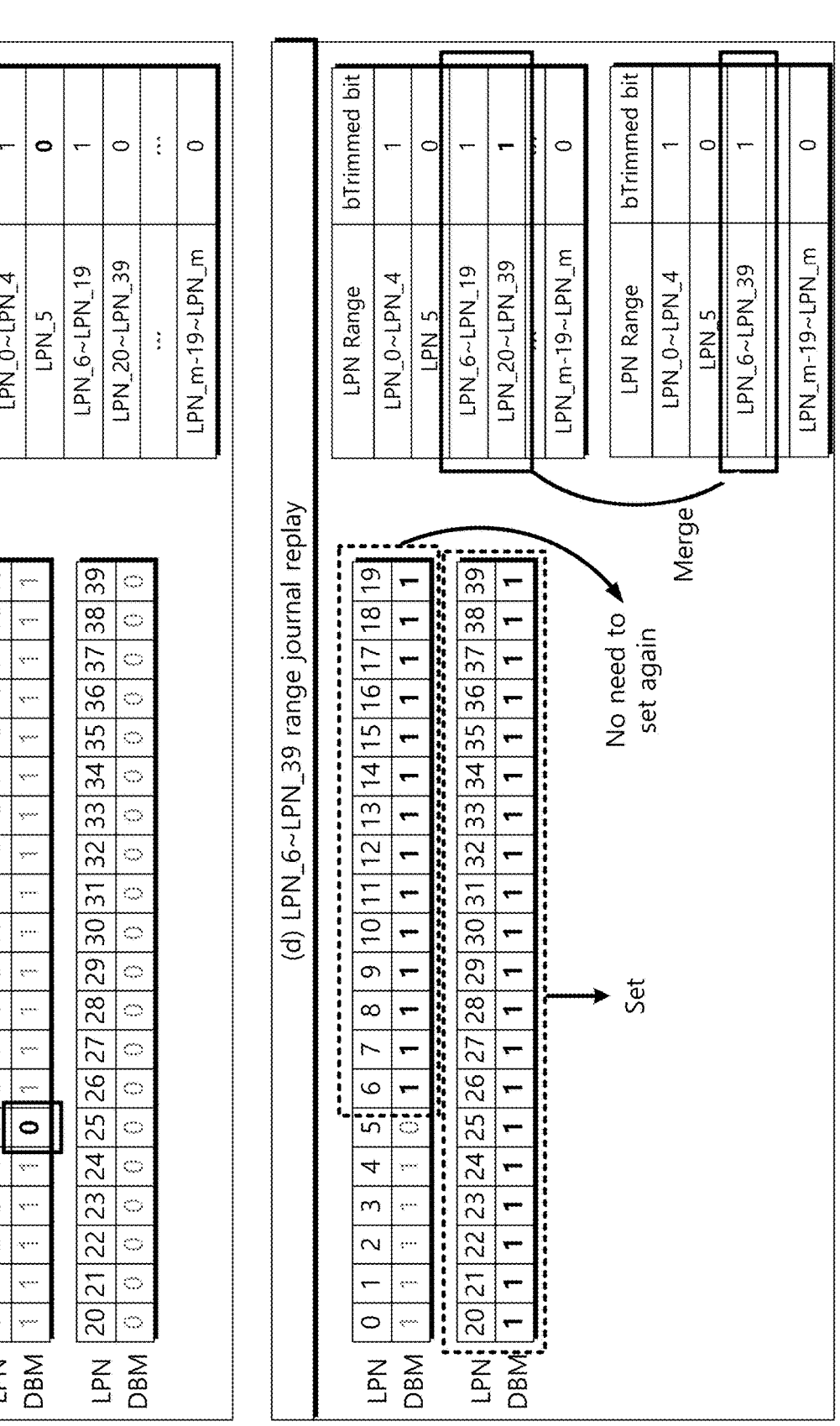

FIGS. 12A, 12B, and 12C are diagrams showing the replay process of the trim journal and write journal, according to an embodiment. In FIGS. 12A, 12B, and 12C, the trim bit bTrimmed of the trim table may be referenced and updated for replay of the trim journal and write journal. For convenience of description, the delete bitmap DBM of metadata MD and the corresponding trim table may be described limited to the logical address range LPN_0 to LPN_39.

Referring to FIG. 12A, table state (a) shows a delete bitmap DBM and a corresponding trim table in the initial state before journal replay is performed. In the initial state, the journal replayer 1216 may generate a trim table with an initialized trim bit bTrimmed value before starting journal replay for metadata MD. When metadata MD is loaded into the buffer memory 1250, the delete bitmap DBM in each unit of the logical address ranges (LPN_0 to LPN_19, LPN_20 to LPN_39, . . . , LPN_m-19 to LPN_m) may be cleared to the clear state. The trim bit bTrimmed corresponding to each of the logical address ranges (LPN_0 to LPN_19, LPN_20 to LPN_39, . . . , LPN_m-19 to LPN_m) may be initialized to the clear state.

Table state (b) of FIG. 12A shows the status of the delete bitmap DBM and trim table after journal replay is performed for the logical address range LPN_0 to LPN_19. By executing the replay of the trim journal of the logical address range LPN_0 to LPN_19, the delete bitmap DBM of each logical address in the logical address range LPN_0 to LPN_19 may be set to the set state. The logical address LPN_i may cover, for example, a memory area in units of eight (8) sectors. However, the present disclosure is not limited in this regard. After setting the metadata delete bitmap DBM to the set state, the journal replayer 1216 may set the trim bit bTrimmed of the corresponding logical address range LPN_0 to LPN_19 to the set state.

Referring to FIG. 12B, table state (c) shows a delete bitmap DBM and a corresponding trim table according to the replay of the write journal for the logical address LPN_5. Continuing to refer to FIG. 12B, table state (d) shows the status of the delete bitmap DBM and the corresponding trim table in the redundant replay corresponding to the logical address range LPN_6 to LPN_39.

Table state (c) shows the status of the delete bitmap DBM and trim table after replay of the write journal for the logical address LPN_5 is performed. As the replay of the write journal of the logical address LPN_5 is executed, the delete bitmap DBM previously set to the set state by the replay of the trim journal may be cleared to the clear state. In the trim table, the trim bit bTrimmed for the logical address LPN_5 may be cleared to the clear state. Since the delete bitmap DBM of the logical address LPN_5 dividing the continuous address range LPN_0 to LPN_19 is cleared, the address range LPN_0 to LPN_19 may be separated. For example, one trim bit bTrimmed in the address range LPN_0 to LPN_19 of the trim table may be divided into three (3) trim bits. That is, the trim bit bTrimmed may be separated into the trim bit bTrimmed corresponding to the logical address LPN_5 that has been cleared to the clear state, the trim bit bTrimmed corresponding to the address range LPN_0-LPN_4, and the trim bit bTrimmed corresponding to the address range LPN_6-LPN_19.

Table state (d) of FIG. 12B shows the status of the delete bitmap DBM and trim table after journal replay is performed for the overlapping logical address range LPN_6 to LPN_39. The journal replayer 1216 may check the trim bit bTrimmed corresponding to the logical address range LPN_6 to LPN_39. The trim bits 'bTrimmed of the logical address range LPN_6 to LPN_39 may be divided according to the replay result of the previous write journal. That is, the trim bit bTrimmed corresponding to the logical address range LPN_6 to LPN_19 may already be set to the set state. The trim bit bTrimmed corresponding to the logical address range LPN_20 to LPN_39 may be in a clear state. Accordingly, the journal replayer 1216 may determine the trim journal corresponding to the logical address range LPN_6 to LPN_19 as a redundant trim journal and skip journal replay. Alternatively, the journal replayer 1216 may execute a replay of the trim journal corresponding to the logical address range LPN_20 to LPN_39. Accordingly, each of the delete bitmaps DBMs in the logical address range LPN_20 to LPN_39 may be set to the set state. The trim bit bTrimmed of the trim table corresponding to the logical address range LPN_20 to LPN_39 may also be set to the set state (e.g., logic '1' or 'high').

In table state (e), as shown in FIG. 12C, the status of the delete bitmap DBM and trim table for the logical address range LPN_20 to LPN_39 corresponding to the redundant trim journal is shown. The journal replayer 1216 may check the trim bit bTrimmed corresponding to the logical address range LPN_20 to LPN_39. The trim bit bTrimmed in the logical address range LPN_20 to LPN_39 may already be maintained in the set state according to the previous replay result. Accordingly, the journal replayer 1216 may determine the trim journal corresponding to the logical address range LPN_20 to LPN_39 as a redundant trim journal and skip journal replay.

In such a manner, the journal replayer 1216 may skip journal replay of the overlapping address range using the trim bit bTrimmed managed in the trim table. Accordingly, the open time of the storage device 1200 that may occur when the storage device 1200 is powered on after repeating the operating system (OS) format or security format may be reduced, when compared to a related storage device.

The above detailed description presents embodiments for carrying out the present disclosure. In addition to the above-described embodiments, the present disclosure may include simple design changes and/or changeable embodiments. In addition, the present disclosure may include techniques that may be easily modified and implemented using the embodiments. Therefore, the scope of the present disclosure should not be limited to the above-described embodiments, and should be defined by the claims and equivalents of the claims of the present disclosure as well as the claims to be described later.

What is claimed is:

1. A journal replay method of a storage device, the journal replay method comprising:

loading metadata into a buffer memory;

initializing a first trim bit and a second trim bit of a trim table to a clear state, the first trim bit indicating a first replay status of a first trim journal in a first address range of the metadata, the second trim bit indicating a second replay status of a second trim journal in a second address range of the metadata;

updating first metadata corresponding to the first address range of the metadata by replaying the first trim journal;

setting the first trim bit corresponding to the replayed first trim journal to a set state;

determining whether the second address range of the metadata of the second trim journal at least partially overlaps the first address range of the metadata; and based on determining that the second address range at least partially overlaps the first address range, skipping replay of the second trim journal based on a state of the first trim bit being the set state, and replaying the second trim journal based on the state of the first trim bit not being the set state.

2. The journal replay method of claim 1, wherein the replaying of the first trim journal comprises:

setting an delete bitmap of the first address range of the metadata from the clear state to the set state.

3. The journal replay method of claim 1, further comprising:

executing a replay of the second trim journal, based on determining that the second address range does not overlap the first address range.

4. The journal replay method of claim 1, further comprising:

replaying a write journal corresponding to an address unit of the first address range; and adding a third trim bit in the clear state corresponding to the address unit to the trim table based on a replay result of the write journal.

5. The journal replay method of claim 4, further comprising:

dividing the first address range into a third address range and a fourth address range based on the address unit.

6. The journal replay method of claim 5, further comprising:

merging the fourth address range and the second address range and managing the merged address range as one trim bit, based on determining that the first address range and the second address range do not overlap and that the fourth address range is continuous with the second address range, after replay of the second trim journal.

7. A storage device, comprising:

a non-volatile memory device storing metadata and journal data;

a buffer memory comprising a metadata buffer into which the metadata is loaded and a trim table composed for replay of at least one of a trim journal or a write journal; and a storage processor communicatively coupled to the non-volatile memory device and the buffer memory, wherein the storage processor is configured to:

read the metadata from the non-volatile memory device;

load the metadata into the metadata buffer;

update the metadata during a journal replay operation by sequentially replaying the journal data from the non-volatile memory device;

replay a second trim journal after replay of a first trim journal, based on a determination that a first address range of the first trim journal and a second address range of the second trim journal do not overlap;

skip the replay of the second trim journal, based on a determination that the first address range and the second address range at least partially overlap and an indication that the first trim journal has been replayed; and replay the second trim journal, based on a determination that the first address range and the second address range at least partially overlap and an indication that the first trim journal has not been replayed.

8. The storage device of claim 7, further comprising:

a journal replayer configured to:

compose the trim table from the journal data; and perform the journal replay operation using the journal data and an update of the trim table.

9. The storage device of claim 8, wherein the journal replayer is further configured to:

update the trim table during the journal replay operation of at least one of the trim journal or the write journal from among the journal data.

10. The storage device of claim 9, wherein the journal replayer is further configured to:

update the trim table with a first trim bit indicating whether to replay the first trim journal and a second trim bit indicating whether to replay the second trim journal.

11. The storage device of claim 10, wherein the journal replayer is further configured to:

determine whether to execute a journal replay for the second trim journal based on the first trim bit and based on the first address range of the first trim journal comprising the second address range of the second trim journal.

12. The storage device of claim 11, wherein the journal replayer is further configured to:

skip the journal replay operation for the second trim journal based on the first trim bit being in a set state indicating that the journal replay operation is completed.

13. The storage device of claim 7, wherein the storage processor is further configured to:

replay a write journal corresponding to an address unit in the first address range; and add a clear state trim bit corresponding to the address unit to the trim table based on a replay result of the write journal.

14. The storage device of claim 13, wherein the storage processor is further configured to:

divide the first address range into a third address range and a fourth address range based on the address unit.

15. The storage device of claim 14, wherein the storage processor is further configured to:

update trim bits corresponding to each of the third address range and the fourth address range in the trim table to a set state.

16. A journal replay method of a storage device, the journal replay method comprising:

initializing a trim table comprising a trim bit indicating whether to execute a replay of a trim journal;

updating metadata by replaying a first trim journal;

setting a first trim bit corresponding to a first address range of the first trim journal of the trim table to a set state;

checking whether a second address range of a second trim journal is comprised in the first address range of the first trim journal; and based on the second address range of the second trim journal being comprised in the first address range of the first trim journal, skipping replay of the second trim journal based on a state of the first trim bit being the set state, and replaying the second trim journal based on the state of the first trim bit not being the set state.

17. The journal replay method of claim 16, further comprising:

executing a replay of the second trim journal based on the second address range of the second trim journal not being overlapped with the first address range of the first trim journal.

18. The journal replay method of claim 16, further comprising:

replaying a write journal for an address unit comprised in the first address range of the first trim journal.

19. The journal replay method of claim 18, further comprising:

dividing the first address range of the first trim journal into a third address range and a fourth address range based on the address unit in the trim table; and assigning a corresponding trim bit to each of the third address range, the fourth address range, and the address unit.

20. The journal replay method of claim 19, further comprising:

merging the fourth address range and another address range in the trim table.

* * * * *